United States Patent
Elshafie et al.

(10) Patent No.: US 12,114,151 B2
(45) Date of Patent: Oct. 8, 2024

(54) TAP-DOMAIN SECRET-KEY GENERATION

(71) Applicant: QUALCOMM Incorporated, San Diego, CA (US)

(72) Inventors: Ahmed Elshafie, San Diego, CA (US); Hung Dinh Ly, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 17/542,265

(22) Filed: Dec. 3, 2021

(65) Prior Publication Data

US 2023/0179995 A1 Jun. 8, 2023

(51) Int. Cl.
*H04W 12/033* (2021.01)
*H04L 1/1607* (2023.01)
*H04L 5/00* (2006.01)
*H04L 9/14* (2006.01)
*H04L 25/02* (2006.01)

(52) U.S. Cl.
CPC ......... *H04W 12/033* (2021.01); *H04L 1/1614* (2013.01); *H04L 5/0048* (2013.01); *H04L 9/14* (2013.01); *H04L 25/0224* (2013.01)

(58) Field of Classification Search
CPC . H04W 12/041; H04W 12/65; H04W 12/033; H04L 9/001; H04L 1/1614; H04L 5/0048; H04L 25/0224; H04L 9/14; H04L 2209/80
USPC ........................................................ 713/170
See application file for complete search history.

(56) References Cited

U.S. PATENT DOCUMENTS

| | | | |
|---|---|---|---|
| 2012/0140922 A1 | 6/2012 | Annavajjala et al. | |
| 2019/0098497 A1* | 3/2019 | Shapira | H04L 9/0875 |
| 2021/0266142 A1* | 8/2021 | Kuang | H04B 10/556 |

FOREIGN PATENT DOCUMENTS

WO WO-2017163160 A1 9/2017

OTHER PUBLICATIONS

Guo D., et al., "A Lightweight Key Generation Scheme for the Internet of Things", IEEE Internet of Things Journal, IEEE, USA, vol. 8, No. 15, Feb. 18, 2021, pp. 12137-12149, XP011868934, abstract, figure 6 p. 12137, left-hand column, line 27-p. 12143, pp. 1-13, right-hand column line 26.
International Search Report and Written Opinion—PCT/US2022/077178—ISA/EPO—Jan. 20, 2023.

* cited by examiner

*Primary Examiner* — Benjamin A Kaplan
(74) *Attorney, Agent, or Firm* — Holland & Hart LLP

(57) ABSTRACT

Methods, systems, and devices for wireless communications are described. A wireless device may receive reference signals from another wireless device over a channel between the devices. The wireless device may perform channel estimation based on the reference signals to determine multiple taps. The wireless device may receive a message from the other wireless device indicating one or more taps to be selected to obtain a secret key for encrypting a message. The wireless device may select the taps based on the indication and communicate one or more encrypted messages with the other wireless device. For example, the wireless device may receive encrypted messages, transmit encrypted messages, or both.

30 Claims, 16 Drawing Sheets

Tap Indication 225     Encrypted Message 230

TAP-DOMAIN SECRET-KEY GENERATION

FIELD OF TECHNOLOGY

The following relates to wireless communications, including tap-domain secret-key generation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support tap-domain secret-key generation. Generally, the described techniques provide for wireless devices to perform channel estimation to determine one or more taps related to a secret key for encrypting signaling. For example, a user equipment (UE) may receive reference signals from another UE, from a base station, or both, and may perform channel estimation on the reference signals. The UE may determine a power delay profile (PDP), a channel impulse response (CIR), or both, based on performing the channel estimation (e.g., taking one or more measurements from the reference signals), and the UE may select taps from the PDP, CIR, or both. In some cases, the UE may receive a message indicating to the UE which taps to select for obtaining a secret key. The UE may transmit or receive a message encrypted according to the secret key.

A method for wireless communication at a first wireless device is described. The method may include receiving, from a second wireless device, one or more reference signals over a channel between the first wireless device and the second wireless device, performing channel estimation for the channel based on the one or more reference signals, where a set of multiple taps associated with the channel are determined based on the channel estimation, receiving a first message from the second wireless device indicating one or more taps to be selected from the set of multiple taps to obtain a secret key for encrypting a second message, and communicating signaling with the second wireless device, the signaling including the second message that is encrypted with the secret key.

An apparatus for wireless communication at a first wireless device is described. The apparatus may include a processor, memory coupled with the processor, and instructions stored in the memory. The instructions may be executable by the processor to cause the apparatus to receive, from a second wireless device, one or more reference signals over a channel between the first wireless device and the second wireless device, perform channel estimation for the channel based on the one or more reference signals, where a set of multiple taps associated with the channel are determined based on the channel estimation, receive a first message from the second wireless device indicating one or more taps to be selected from the set of multiple taps to obtain a secret key for encrypting a second message, and communicate signaling with the second wireless device, the signaling including the second message that is encrypted with the secret key.

Another apparatus for wireless communication at a first wireless device is described. The apparatus may include means for receiving, from a second wireless device, one or more reference signals over a channel between the first wireless device and the second wireless device, means for performing channel estimation for the channel based on the one or more reference signals, where a set of multiple taps associated with the channel are determined based on the channel estimation, means for receiving a first message from the second wireless device indicating one or more taps to be selected from the set of multiple taps to obtain a secret key for encrypting a second message, and means for communicating signaling with the second wireless device, the signaling including the second message that is encrypted with the secret key.

A non-transitory computer-readable medium storing code for wireless communication at a first wireless device is described. The code may include instructions executable by a processor to receive, from a second wireless device, one or more reference signals over a channel between the first wireless device and the second wireless device, perform channel estimation for the channel based on the one or more reference signals, where a set of multiple taps associated with the channel are determined based on the channel estimation, receive a first message from the second wireless device indicating one or more taps to be selected from the set of multiple taps to obtain a secret key for encrypting a second message, and communicate signaling with the second wireless device, the signaling including the second message that is encrypted with the secret key.

Some examples of the method, apparatuses, and non-transitory computer-readable medium described herein may further include operations, features, means, or instructions for determining a PDP, a CIR, or both for the channel based on performing the channel estimation and selecting the one or more taps from the PDP, the CIR, or a combination thereof based on the channel estimation and the received first message.

In some examples of the method, apparatuses, and non-transitory computer-readable medium described herein, the first message indicates the one or more taps according to a power threshold corresponding to the channel being satisfied at the second wireless device.

Some examples of the method, apparatuses, and non-transitory computer-readable medium described herein may further include operations, features, means, or instructions for determining one or more coefficients corresponding to a location of the one or more taps, where the secret key may be obtained based on the one or more coefficients.

Some examples of the method, apparatuses, and non-transitory computer-readable medium described herein may further include operations, features, means, or instructions for mapping one or more taps to the one or more coefficients based on a respective index of each tap of the one or more taps and quantizing the one or more coefficients based on applying a key derivation function to the one or more coefficients to obtain the secret key.

Some examples of the method, apparatuses, and non-transitory computer-readable medium described herein may further include operations, features, means, or instructions for determining a resource element channel coefficient corresponding to one or more channels, where the quantizing may be based on the resource element channel coefficient.

In some examples of the method, apparatuses, and non-transitory computer-readable medium described herein, the one or more coefficients include a reference signal received power, a reference signal received quality, a signal-to-interference ratio, a signal-to-interference and noise ratio, a tap value, an energy metric, or a combination thereof.

Some examples of the method, apparatuses, and non-transitory computer-readable medium described herein may further include operations, features, means, or instructions for determining that a signal-to-noise ratio for the channel satisfies a threshold based on performing the channel estimation and encrypting the second message and one or more repeated pilot signals with the secret key based on the signal-to-noise ratio satisfying the threshold.

Some examples of the method, apparatuses, and non-transitory computer-readable medium described herein may further include operations, features, means, or instructions for determining that a signal-to-noise ratio for the channel satisfies a threshold based on performing the channel estimation and performing a key refinement procedure to obtain a refined secret key based on the signal-to-noise ratio satisfying the threshold, where the second message may be encrypted with the refined secret key.

In some examples of the method, apparatuses, and non-transitory computer-readable medium described herein, the first message includes a bitmap indicating the one or more taps.

Some examples of the method, apparatuses, and non-transitory computer-readable medium described herein may further include operations, features, means, or instructions for receiving, prior to receiving the first message, a third message indicating a set of multiple bitmaps including the bitmap, each bitmap indicating a set of taps, receiving, prior to receiving the first message and after receiving the third message, a fourth message indicating one or more bitmaps including the bitmap, where the first message includes a downlink control information message, the third message includes radio resource control signaling, and the fourth message includes a medium access control-control element, and selecting the one or more taps based on receiving the first message, the third message, and the fourth message.

In some examples of the method, apparatuses, and non-transitory computer-readable medium described herein, receiving the first message may include operations, features, means, or instructions for receiving the one or more reference signals on one or more resources that include the first message.

Some examples of the method, apparatuses, and non-transitory computer-readable medium described herein may further include operations, features, means, or instructions for receiving a control message configuring a resource pool for sidelink communications with the second wireless device, where the resource pool includes the one or more resources configured with one or more bitmaps, where at least one bitmap of the one or more bitmaps indicates the one or more taps.

In some examples of the method, apparatuses, and non-transitory computer-readable medium described herein, a resource configuration for the one or more reference signals includes a bitmap indicating the one or more taps.

Some examples of the method, apparatuses, and non-transitory computer-readable medium described herein may further include operations, features, means, or instructions for selecting the one or more taps according to a threshold value of non-zero taps based on the first message, where the threshold value of non-zero taps may be configured at the first wireless device.

Some examples of the method, apparatuses, and non-transitory computer-readable medium described herein may further include operations, features, means, or instructions for selecting the one or more taps according to a random tap pattern from a set of random tap patterns based on the first message and transmitting an index of the random tap pattern to the second wireless device.

Some examples of the method, apparatuses, and non-transitory computer-readable medium described herein may further include operations, features, means, or instructions for encrypting one or more fields of the second message using the secret key, where the second message may be communicated over the channel based on the encryption.

In some examples of the method, apparatuses, and non-transitory computer-readable medium described herein, communicating the signaling with the second wireless device may include operations, features, means, or instructions for transmitting the signaling including the second message to the second wireless device and receiving the signaling including the second message from the second wireless device.

A method for wireless communication at a first wireless device is described. The method may include transmitting, to a second wireless device, one or more reference signals over a channel between the first wireless device and the second wireless device, performing channel estimation for the channel based on the one or more reference signals, where a set of multiple taps associated with the channel are determined based on the channel estimation, transmitting a first message to the second wireless device indicating one or more taps to be selected from the set of multiple taps to obtain a secret key for encrypting a second message, and communicating signaling with the second wireless device, the signaling including the second message that is encrypted with the secret key.

An apparatus for wireless communication at a first wireless device is described. The apparatus may include a processor, memory coupled with the processor, and instructions stored in the memory. The instructions may be executable by the processor to cause the apparatus to transmit, to a second wireless device, one or more reference signals over a channel between the first wireless device and the second wireless device, perform channel estimation for the channel based on the one or more reference signals, where a set of multiple taps associated with the channel are determined based on the channel estimation, transmit a first message to the second wireless device indicating one or more taps to be selected from the set of multiple taps to obtain a secret key for encrypting a second message, and communicate signaling with the second wireless device, the signaling including the second message that is encrypted with the secret key.

Another apparatus for wireless communication at a first wireless device is described. The apparatus may include means for transmitting, to a second wireless device, one or more reference signals over a channel between the first wireless device and the second wireless device, means for performing channel estimation for the channel based on the one or more reference signals, where a set of multiple taps associated with the channel are determined based on the channel estimation, means for transmitting a first message to the second wireless device indicating one or more taps to be selected from the set of multiple taps to obtain a secret key for encrypting a second message, and means for communicating signaling with the second wireless device, the signaling including the second message that is encrypted with the secret key.

A non-transitory computer-readable medium storing code for wireless communication at a first wireless device is described. The code may include instructions executable by a processor to transmit, to a second wireless device, one or more reference signals over a channel between the first wireless device and the second wireless device, perform channel estimation for the channel based on the one or more reference signals, where a set of multiple taps associated with the channel are determined based on the channel estimation, transmit a first message to the second wireless device indicating one or more taps to be selected from the set of multiple taps to obtain a secret key for encrypting a second message, and communicate signaling with the second wireless device, the signaling including the second message that is encrypted with the secret key.

Some examples of the method, apparatuses, and non-transitory computer-readable medium described herein may further include operations, features, means, or instructions for determining a PDP, a CIR, or both for the channel based on performing the channel estimation and selecting the one or more taps to indicate in the first message from the PDP, the CIR, or a combination thereof based on the channel estimation and the received first message.

In some examples of the method, apparatuses, and non-transitory computer-readable medium described herein, the first message indicates the one or more taps according to a power threshold corresponding to the channel being satisfied at the second wireless device.

Some examples of the method, apparatuses, and non-transitory computer-readable medium described herein may further include operations, features, means, or instructions for determining one or more coefficients corresponding to a location of the one or more taps, where the secret key may be obtained based on the one or more coefficients.

Some examples of the method, apparatuses, and non-transitory computer-readable medium described herein may further include operations, features, means, or instructions for mapping one or more taps to the one or more coefficients based on a respective index of each tap of the one or more taps and quantizing the one or more coefficients based on applying a key derivation function to the one or more coefficients to obtain the secret key.

Some examples of the method, apparatuses, and non-transitory computer-readable medium described herein may further include operations, features, means, or instructions for determining that a signal-to-noise ratio for the channel satisfies a threshold based on performing the channel estimation and encrypting the second message and one or more repeated pilot signals with the secret key based on the signal-to-noise ratio satisfying the threshold.

Some examples of the method, apparatuses, and non-transitory computer-readable medium described herein may further include operations, features, means, or instructions for determining that a signal-to-noise ratio for the channel satisfies a threshold based on performing the channel estimation and performing a key refinement procedure to obtain a refined secret key based on the signal-to-noise ratio satisfying the threshold, where the second message may be encrypted with the refined secret key.

In some examples of the method, apparatuses, and non-transitory computer-readable medium described herein, the first message includes a bitmap indicating the one or more taps and the method, apparatuses, and non-transitory computer-readable medium may include further operations, features, means, or instructions for transmitting, prior to transmitting the first message, a third message indicating a set of multiple bitmaps including the bitmap, each bitmap indicating a set of taps and transmitting, prior to transmitting the first message and after transmitting the third message, a fourth message indicating one or more bitmaps including the bitmap, where the first message includes a downlink control information message, the third message includes radio resource control signaling, and the fourth message includes a medium access control-control element, where indicating the one or more taps may be based on transmitting the first message, the third message, and the fourth message.

Some examples of the method, apparatuses, and non-transitory computer-readable medium described herein may further include operations, features, means, or instructions for determining a threshold value of non-zero taps for the second wireless device and selecting the one or more taps to indicate in the first message according to the threshold value of non-zero taps.

Some examples of the method, apparatuses, and non-transitory computer-readable medium described herein may further include operations, features, means, or instructions for receiving, from the second wireless device, an index of a random tap pattern from a set of random tap patterns, where the first message includes the set of random tap patterns.

DETAILED DESCRIPTION

In some wireless communications systems, one or more user equipments (UEs) may communicate with other UEs, with base stations, or both, such as in an internet of things (IoT) system. Communications in these systems may increasingly rely on secured communications, where various messages transmitted wirelessly between devices (e.g., UEs, base stations) may be secured using one or more security keys. As such, the wireless devices (e.g., the UEs and base stations) may secure one or more transmissions over a channel by using secret key extraction. For example, two wireless devices may send reference signals to each other over a channel to use for channel estimation. The wireless devices may obtain one or more metrics from the channel estimation and may quantize the metrics to obtain a secret key. A transmitting device may secure a transmissions over a channel, secure one or more fields within a message transmitted over the channel, or both. In some examples, however, the transmitting device may rely on channel reciprocity to secure the transmission, such as in cases where the channel estimation may be per resource element.

In some examples, one or more wireless devices may secure a channel by extracting a security key using a tap domain of the channel. In some examples, both a receiving wireless device and a transmitting wireless device may perform the secret key extraction procedure. For example, one or more wireless devices may perform channel estimation using reference signals from another wireless device to obtain a set of tap values (e.g., from a channel impulse response (CIR), from a power delay profile (PDP), or both) for the channel. In some cases, a wireless device may select one or more taps based on an indication from another wireless device (e.g., a base station or a controlling UE), and may obtain a secret key according to coefficients at a location of the one or more taps. For example, the wireless device may map the taps to the coefficients, quantize the coefficients by applying a key derivation function, or both. The wireless devices may communicate signaling by encrypting messages with the secret key.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to tap-domain secret-key generation.

Figure 1:
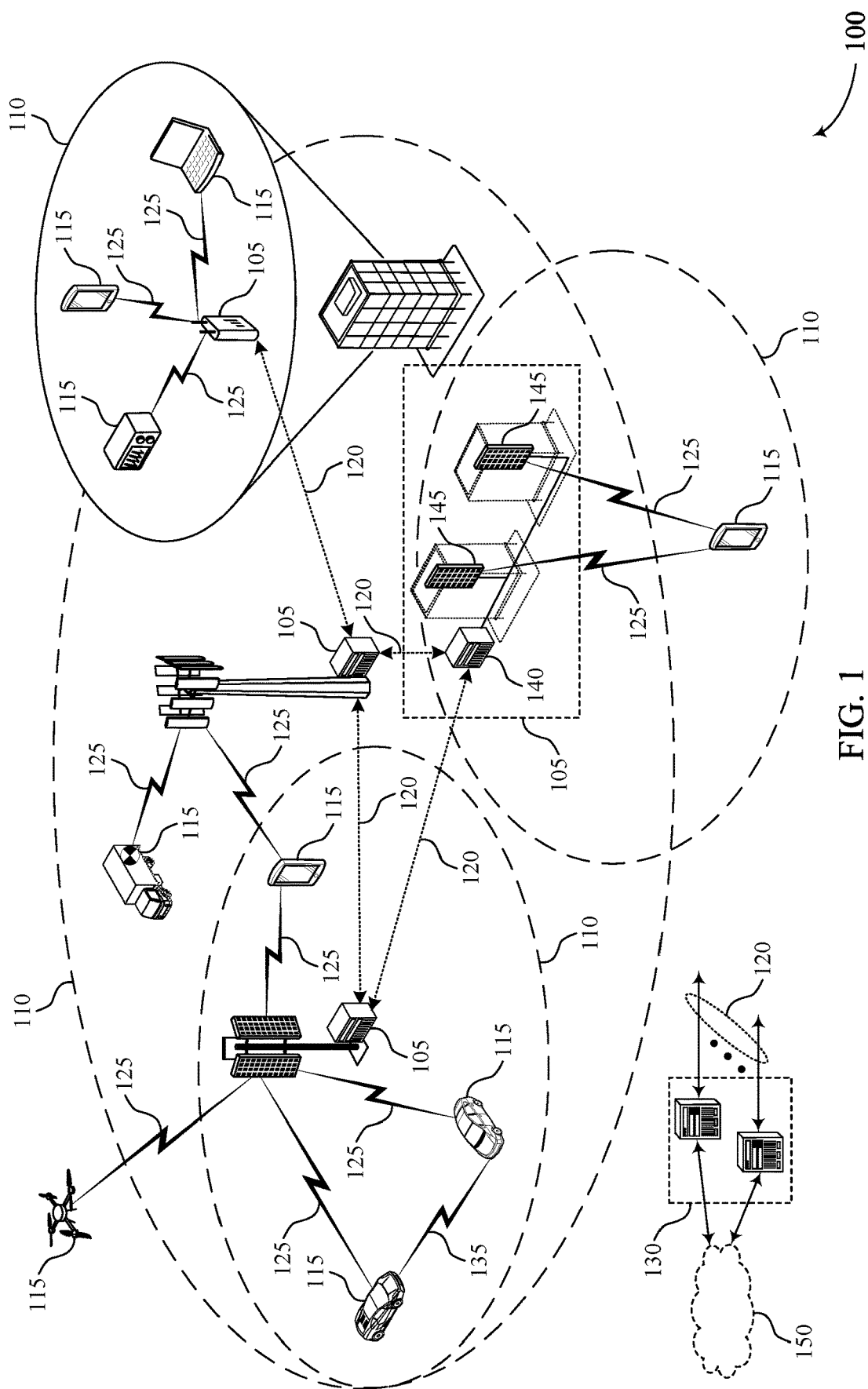
FIGS. 1 and 2 illustrate examples of wireless communications systems that support tap-domain secret-key generation in accordance with aspects of the present disclosure.

FIG. 1 illustrates an example of a wireless communications system 100 that supports tap-domain secret-key generation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, one or more UEs 115 may communicate with other UEs 115, with base stations 105, or both. The wireless devices (e.g., the UEs 115 and base stations 105) may secure one or more transmissions over a channel by using secret key extraction. For example, two wireless devices may send reference signals to each other over a channel to use for channel estimation. In some examples, the reference signals may include sounding reference signals (SRSs) transmitted in one or more time-frequency resources, which may be referred to as SRS resources. The SRS resources may span a number of adjacent time resources, such as symbols, (e.g., 1, 2, or 4 adjacent symbols). There may be a configured number of ports per SRS (e.g., up to 4 ports per SRS resource). In some cases, each ports of an SRS resource may be sounded in each symbol. An SRS may be transmitted in the last symbols of a slot (e.g., the last 6 symbols), may be transmitted after an uplink shared channel in the slot, or both. An SRS resource set may include a sets of SRS resources transmitted by a UE 115 and may be transmitted according to aperiodic (e.g., downlink control information (DCI)-signaled), semi-persistent, or periodic signaling. In some examples, a UE 115 may be configured with multiple resources, which may be grouped in an SRS resource set based on a use case (e.g., antenna switching, codebook-based, non-codebook based, beam management). An SRS transmission may be a wideband transmission, a subband transmission, or the like, according to a bandwidth (e.g., which may be a multiple of 4 physical resource blocks (PRBs)).

The wireless devices may obtain one or more metrics from the channel estimation based on the reference signals. The wireless device may quantize the metrics to obtain a secret key. A transmitting device may secure a transmissions over a channel, secure one or more fields within a message transmitted over the channel, or both. However, in some examples, the transmitting device may rely on channel reciprocity to secure the transmission, as the channel estimation may be per resource element.

In some examples, one or more wireless devices may secure a channel by extracting a security key using a tap domain of the channel. In some examples, both a receiving wireless device and a transmitting wireless device may perform the secret key extraction procedure. For example, one or more wireless devices may perform channel estimation using reference signals from another wireless device to obtain a tap-domain (e.g., a CIR, a PDP, or both) for the channel. A wireless device may select one or more taps based on an indication from another wireless device (e.g., a base station 105 or a controlling UE 115), and may obtain a secret key according to coefficients at a location of the one or more taps. For example, the wireless device may map the taps to the coefficients, quantize the coefficients by applying a key derivation function, or both. The wireless devices may communicate signaling by encrypting messages with the secret key. In some cases, the secret key may be updated at various times, for example, based on a timer or a periodicity. Additionally or alternatively, the secret key may be updated dynamically.

Figure 2:
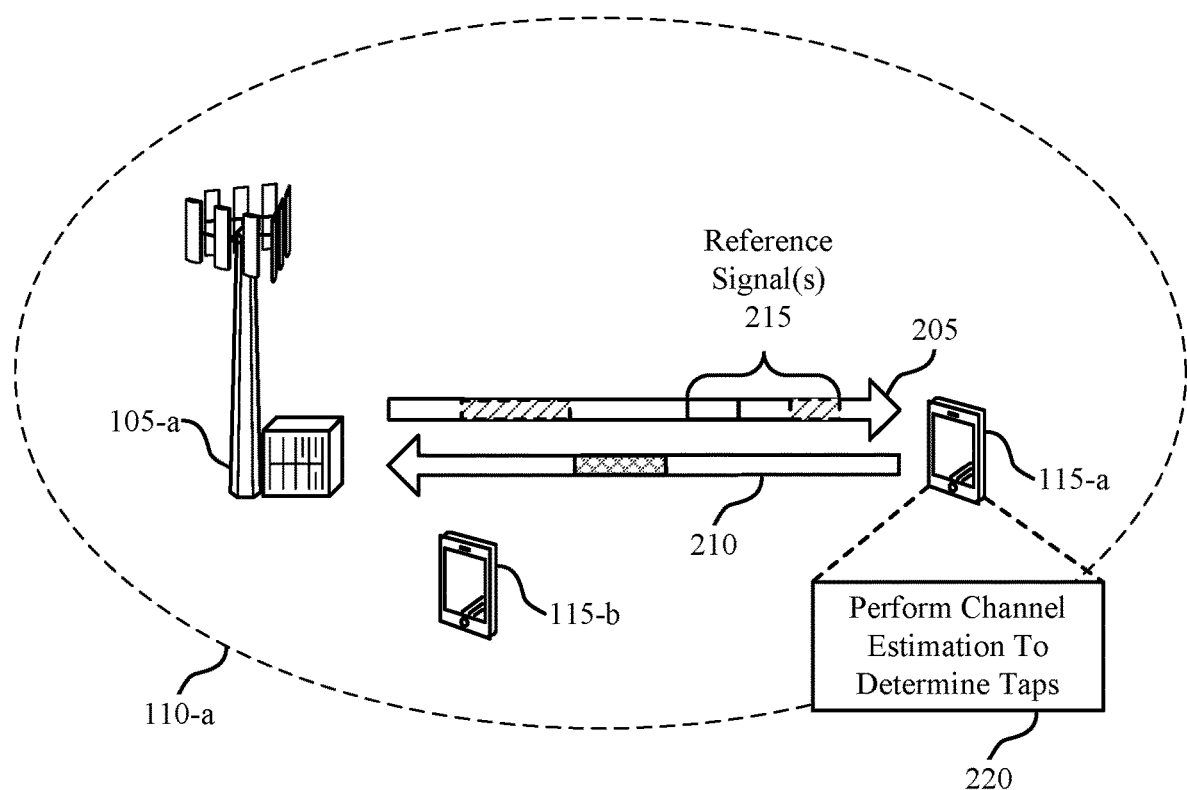
Figure 2:
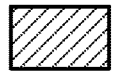
Figure 2:

FIG. 2 illustrates an example of a wireless communications system 200 that supports tap-domain secret-key generation in accordance with aspects of the present disclosure. In some examples, wireless communications system 200 may implement aspects of wireless communications system 100 and may include a UE 115-a, a UE 115-b, and a base station 105-a with a coverage area 110-a, which may be examples of UEs 115 and a base station 105 with a coverage area 110 as described with reference to FIG. 1. In some examples, base station 105-a and one or more UEs 115, such as UE 115-a and UE 115-b, may communicate control information, data, or both using a downlink communication link 205. A UE 115-a may communicate control information, data, or both with a base station 105 using an uplink communication link 210. Similarly, UE 115-a may communicate control information, data, or both with another UE via a sidelink communication link. In some examples, base station 105-a may be an example of a controlling UE 115 (e.g., for sidelink communication), a power line communication (PLC), a primary UE 115, or the like.

The wireless communications system 200 may be an example of an IoT system, in which UE 115-a, UE 115-b, and base station 105-a are connected or in contact with each other. In some examples, if UE 115-a communicates with base station 105-a, UE 115-a and base station 105-a may secure the communications to prevent UE 115-b from eavesdropping (e.g., obtaining the content of messages transmitted between UE 115-a and base station 105-a, even though UE 115-b may not be permitted access to the content). In some examples, there may be security protocol at different layers, such as a physical layer of communication. Physical layer security may include secret-key sharing, where a pair of wireless devices (e.g., UEs 115, a base station 105, and UE 115, or the like) may extract a secret key from a channel. The wireless devices may use the secret key to secure one or more unsecured channels or transmissions (e.g., a physical uplink control channel (PUCCH), a DCI message, and the like) and to improve security of other channels, such as a shared channel at the physical layer. In some cases, the wireless devices may add additional transmission security with addition secure bits obtained from channels and sounding signals between devices (e.g., nodes in an IoT system).

In some examples, a wireless device, such as UE 115-a, base station 105-a, or both, may perform secret-key extraction. That is, to prevent UE 115-b from listening to communications between base station 105-a and UE 115-a, base station 105-a and UE 115-a may perform secret key extraction. The process for secret key extraction may involve multiple wireless devices sending one or more reference signals 215 to each other. For example, base station 105-a may send reference signals 215 to UE 115-a. Additionally or alternatively, UE 115-a may send reference signals 215 to base station 105-a. The wireless devices may use the reference signals 215 to perform channel estimation. For example, at 220 UE 115-a may perform channel estimation by performing one or more measurements on the reference signals 215 from base station 105-a. The one or more measurements may include one or more channel metrics, such as channel power, reference signal received power (RSRP), signal interference to noise ratio (SINR), phase, and the like. The wireless devices may quantize a mapped value based on the channel estimation to obtain a secret key. Both UE 115-a and base station 105-a may obtain the secret key.

The described techniques may enable reliable and robust transmission security schemes, particularly in cases where channel conditions satisfy some threshold. For example, for a relatively high SNR case, the wireless devices may secure a channel for one or more transmissions using the secret key. In other examples, the wireless devices may repeat pilot signal transmissions or perform a key refinement procedure (e.g., an additional key refinement procedure). The key refinement procedure, in some examples, may include UE 115-*a* or base station 105-*a*, or both, transmitting one or more additional reference signals and performing channel estimation based on the additional reference signals. The channel estimation based on the additional reference signals may provide additional information (e.g., taps) to be used for generating the secret key. The wireless devices may use the secret key to secure transmissions, secure some fields within a message transmitted via physical layer channel (e.g., some information in a PDCCH, physical uplink control channel (PUCCH), physical downlink shared channel (PDSCH), physical uplink shared channel (PUSCH), or the like).

In some examples, the secret key extraction scheme may be successful based on channel reciprocity (e.g., for TDD systems). The channel reciprocity key extraction scheme may use per-resource element channel estimation, so the secret key extraction may be realized in frequency domain. In some examples, a secret key extraction scheme may be based on a CIR or tap domain, which may not be based on channel reciprocity. After a wireless device performs channel estimation to determine the CIR or a PDP, the wireless device may extract the secret key from one or more taps. For example, the wireless device may quantize an amplitude, a phase, or both, of the taps after some mapping or hashing. In some examples, the wireless device may receive an indication of one or more taps, such as a tap set, and may use the tap set to extract the secret key after channel estimation.

In some environments, a transmitted signal may reach a receiving device, such as UE 115-*a*, via multiple paths due to multi-path propagation, where a transmitted signal may encounter reflective surfaces (e.g., buildings, water, vehicles, mountains) during transmission. Multipath propagation may refer to a signal that takes two or more paths from a transmitting device to a receiving device. One of the paths may be direct path from the transmitting device to the receiving device such that the signal does not reflect off any surfaces prior to reaching the receiving device, and as such, the direct path may result in the strongest signal and the signal that arrives first at the receiver. In some cases, a path of the signal may incur one or more reflections prior to reaching the receiving devices. Each reflection that a signal incurs on path may result in more time that a signal travels on a path and result in a weaker signal. Signals that travel via non-direct paths (e.g., paths with one or more reflections) may thus be weaker in strength and arrive after a signal that travels via a direct path. As such, the receiving device may receive the transmitted signal as one or more signals dispersed in time and varying in strengths.

A PDP or CIR may chart the intensity (e.g., strength, power, intensity, or the like) of a signal received through a multipath channel as a function of time delay, where the time delay is the difference in travel time between multipath arrivals. As such, a discrete PDP or CIR may represent each path the signal traveled, where each path on the PDP or CIR may be referred to as a tap. A tap on the PDP or CIR may correspond to the received power and the time (e.g., relative time, actual time) at which the receiving device received a signal. The PDP or CIR may include any number of taps. In some examples, the strongest and first tap on the PDP or CIR may be the signal that traveled over the direct path. Each tap, such as taps representing signals that incurred one or more reflections, following the direct-path tap, may be weaker and may have arrived relatively later than direct-path tap. A delay spread may refer to the difference (e.g., the spread) between the time of arrival of the earliest tap (e.g., the line-of-sight signal, direct signal) and the time of arrival of the last received tap associated with the originally transmitted signal.

In some examples, UE 115-*a*, base station 105-*a*, or both may exchange the reference signals 215 for tap-domain secret key extraction. Each wireless device (e.g., UE 115-*a* and base station 105-*a*) may estimate a channel at a resource element level. The wireless devices may obtain the tap-domain (e.g., CIR, PDP, or both) of the channel. UE 115-*a* may select one or more taps to obtain the secret key. For example, base station 105-*a*, or a controlling UE 115 (e.g., for sidelink communication), may transmit a tap indication 225 to UE 115-*a* via downlink communication link 205. The tap indication 225 may indicate one or more taps for UE 115-*a* to use to obtain the secret key. The one or more taps, which may be a subset of taps, may be at least partially based on channel estimation performed at base station 105-*a* (e.g., based on a power criterion or threshold at base station 105-*a*).

In some cases, UE 115-*a* may obtain a mapped value based on coefficients observed at the taps in tap indication 225. The coefficients may be one or more of a RSRP, reference signal received quality (RSRQ), signal-to-interference ratio (SIR), SINR, energy metric, the tap values as is, or the like. UE 115-*a* may quantize the mapped value, or after mapping, may use the values as input to a key derivation function. UE 115-*a* and base station 105-*a* may both obtain the secret key. UE 115-*a*, base station 105-*a*, or both may use the secret key to secure one or more transmissions, field in a message via a physical layer channel, or the like. For example, base station 105-*a* may transmit an encrypted message 230 to UE 115-*a* via the downlink communication link 205, UE 115-*a* may transmit an encrypted message 230 to base station 105-*a* via the uplink communication link 210, or both.

In some examples, UE 115-*a*, base station 105-*a*, or both may perform the channel estimation to identify taps, such as $h_1, h_2, h_3 \ldots h_N$, where h may be a complex value of a tap and N is the number of taps. Then, base station 105-*a* may send tap indication 225 to UE 115-*a*, which may indicate for UE 115-*a* to select one or more taps, such as $h_1, h_5, h_{N-1}$. UE 115-*a* may perform a mapping, such as by using a function, G, (e.g., $G(h_1, h_5, h_{N-1})$), where G may include quantization. UE 115-*a* may also use G to compute the PDP, power of the selected taps, or the like. UE 115-*a* may use the computation as an input to the key derivation function.

In some cases, UE 115-*a* may select one or more taps based on the tap indication 225 from base station 105-*a* to obtain the secret key. For example, when base station 105-*a* configures UE 115-*a* for communications (e.g., for Uu communication, sidelink mode 1, or both), base station 105-*a* may transmit a bitmap indicating a tap set via control signaling, which is described in further detail with respect to FIG. 3. The control signaling may include RRC signaling (e.g., secured at Layer 3 (L3)), a medium access control-control element (MAC-CE) (e.g., secured using Layer 2 (L2) encryption schemes), DCI (e.g., not secured by upper layers), or a combination thereof. The tap set may be the one or more taps that UE 115-*a* selects from the CIR or PDP to extract the secret key. In such cases, the UE 115-*a* may use one or more taps in addition to some additional channel estimation metrics (e.g., from one or more measurements). In some cases, the channel estimation metrics may be based on frequency-domain measurements on one or more resource elements. In some examples, base station 105-*a* may indicate multiple bitmaps in RRC signaling, then a MAC-CE may down select the multiple bitmaps to one or more bitmaps, then a DCI message may select a single bitmap. If an eavesdropper obtains the bitmap information, the encrypted message 230 may continue to be secured as long as the CIR of the eavesdropper's channel (e.g., the channel between the transmitting device and a device that is not intended and/or not authorized to receive a secured message from the transmitting device) is independent (e.g., tap coefficients are independent) from the CIR of the legitimate receiver's channel (e.g., the channel between the transmitting device and the intended receiving device). Thus, by sharing the bitmap using a secured channel (e.g., via RRC signaling) the security of the transmission is further increased, especially for correlated CIRs.

Figure 4:
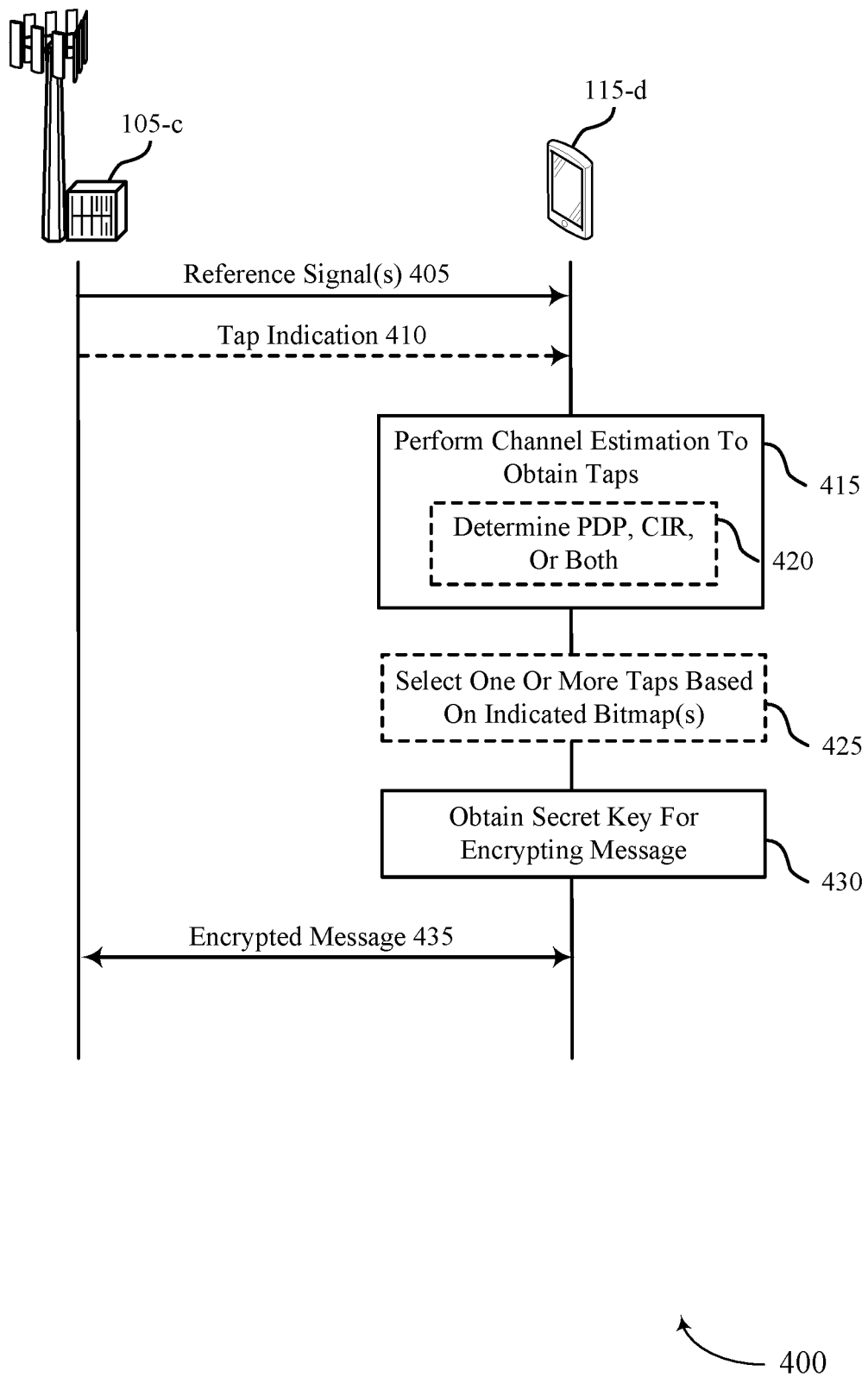

In some examples, the one or more reference signals 215 may include the tap indication 225, which is described in further detail with respect to FIG. 4. The reference signals 215 may include SRSs, channel state information-reference signals (CSI-RSs), and the like. In some cases, base station 105-*a* may transmit the reference signals 215 to UE 115-*a* using one or more time-frequency resources (e.g., over a Uu communication link, such as downlink communication link 205). Similarly, UE 115-*a* may transmit additional reference signals 215 using one or more time-frequency resources to base station 105-*a* (e.g., over a Uu communication link, such as uplink communication link 210). In some examples, base station 105-*a* may configure the time-frequency resources to include the bitmap of taps, a set of taps, a pattern of taps, or the like, used for secret key extraction. For example, base station 105-*a* may configure the time-frequency resources such that multiple bitmaps may be indicated per resource. Then, control signaling (e.g., a MAC-CE) from base station 105-*a* may down select the multiple bitmaps to one or more bitmaps. In some examples, base station 105-*a* may use dynamic control signaling, such as a DCI message, to select a bitmap from the one or more bitmaps for UE 115-*a* to use to obtain (e.g., compute, generate) the secret key. In some examples, a size of the one or more bitmaps may be based on a number of non-zero taps used to generate the secret key.

In some examples, for sidelink communication, or vehicle communication in a V2X system (PC5) (e.g., where base station 105-*a* is a controlling UE 115 in a sidelink connection with UE 115-*a*), a base station 105-*a* may configure a resource pool with a tap-domain bitmap that may be used by UE 115-*a* for secret key extraction. One or more sidelink reference signal resource configurations may include the bitmap. Base station 105-*a* may configure the resource pool with multiple bitmaps or a common bitmap across multiple resource pools, then a controlling UE 115 may send control signaling (e.g., a PC5 MAC-CE) to UE 115-*a* to down select the multiple bitmaps to one or more bitmaps or patterns. A controlling UE 115 (e.g., a transmitting UE 115, a programmable logic controller (PLC)) may select the bitmap or pattern for UE 115-*a* (e.g., a receiving UE 115) to use to obtain the secret key from a set of bitmaps or patterns configured per resource pool or across resource pools. The controlling UE 115, which may also be referred to as a primary UE 115, may signal a bitmap to UE 115-*a* based on selecting the bitmap or using a new bitmap. The signaling may be PC5 RRC, MAC-CE, sidelink control information (SCI) type 2, which may not be secured, or may be multiplexed with data at layer 3, which may be secured.

In some examples, base station 105-*a*, or a controlling UE 115, and UE 115-*a* may agree to use at least one criteria to select taps for secret key extraction. The criteria may include a threshold value of non-zero taps, K, where K may be configured via control signaling (e.g., RRC or MAC-CE) or per reference signal resource. The threshold value may be a highest value of non-zero taps, a lowest value of non-zero taps, or another defined value of non-zero taps. Additionally or alternatively, the criteria may include UE 115-*a* selecting a random tap pattern from a defined set of patterns, and signaling the tap pattern index to base station 105-*a* or the controlling UE 115 in uplink control information (UCI) or via an uplink shared channel (e.g., PUSCH) transmission. For sidelink, UE 115-*a* may transmit the tap pattern index in a physical shared feedback channel (PSFCH) transmission, via a MAC-CE, in SCI, piggybacked in a physical sidelink shared channel (PSSCH) transmission, or the like.

In some examples, UE 115-*a* may obtain a mapped value based on coefficients observed at the taps indicated in tap indication 225. Prior to mapping the tap-domain coefficients, or computing a metric for quantization, base station 105-*a* and UE 115-*a* may agree to use a resource element channel coefficient in accordance with one or more channels for each tap, where the channels are defined by taps in a time domain. The combination of resource element channel coefficient and channels may be used to compute a metric for quantization of the mapped values.

Once UE 115-*a*, base station 105-*a*, or both obtains the secret key, UE 115-*a*, base station 105-*a*, or both may encrypt (e.g., encode, cypher) a message, such as a data message, for transmission using the secret key. For example, UE 115-*a* may transmit encrypted message 230 to base station 105-*a* via uplink communication link 210. Additionally or alternatively, base station 105-*a* may transmit an encrypted message 230 to UE 115-*a* via downlink communication link 205. Other wireless devices within range of the transmission, such as UE 115-*b*, may not decode the message without the secret key, thus the encrypted message 230 may be secure.

Figure 3:
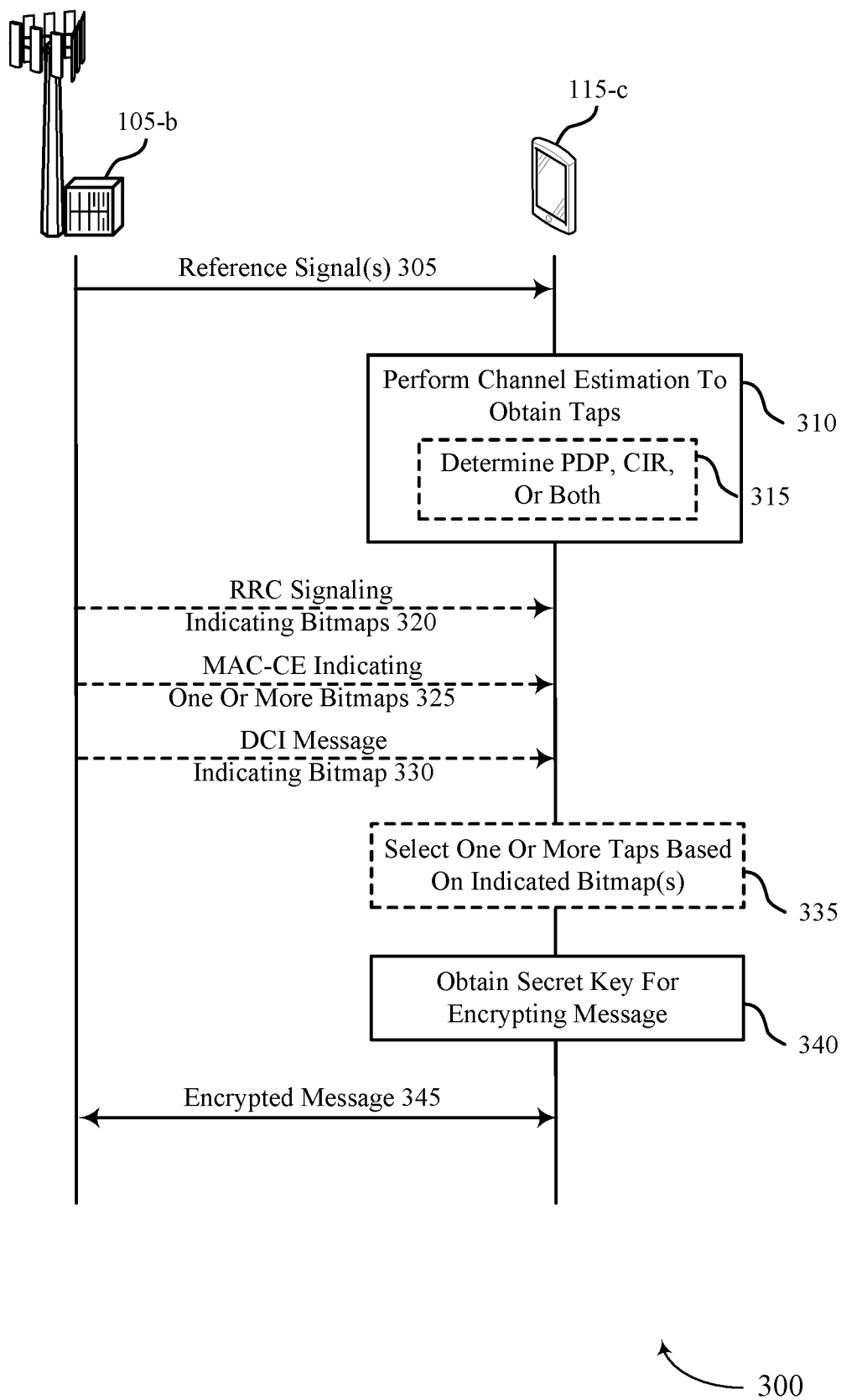
FIGS. 3 and 4 illustrate examples of process flows in a system that support tap-domain secret-key generation in accordance with aspects of the present disclosure.

FIG. 3 illustrates an example of a process flow 300 in a system that supports tap-domain secret-key generation in accordance with aspects of the present disclosure. In some examples, process flow 300 may implement aspects of wireless communications system 100 and wireless communications system 200. The process flow 300 may illustrate an example of a base station 105-*b* indicating one or more taps for a UE 115-*c* to obtain a secret key, the taps based on a bitmap in control signaling. Base station 105-*b* and UE 115-*c* may be examples of a base station 105 and a UE 115 as described with reference to FIGS. 1 and 2. Alternative examples of the following may be implemented, where some processes are performed in a different order than described or are not performed. In some cases, processes may include additional features not mentioned below, or further processes may be added.

In some examples, the actions described as being performed by a base station 105 may additionally or alternatively be performed by a UE 115 (e.g., a controlling or primary UE 115 in a sidelink example). Similarly, the actions described as being performed by UE 115-*c* may additionally or alternatively be performed at base station 105-*b*. That is, base station 105-*b* may also perform the process to obtain a secret key for encrypting a message.

At 305, UE 115-*c* may receive one or more reference signals from base station 105-*b* over a channel between UE 115-*c* and base station 105-*b*. The reference signals may include SRSs, CSI-RSs, or the like.

At 310, UE 115-*c* may perform channel estimation for the channel based on the one or more reference signals. For example, UE 115-*c* may estimate one or more parameters or metrics related to the channel, such as RSRP, channel power, SINR, phase, or the like. UE 115-*c* may determine multiple taps for the channel based on performing the channel estimation.

In some cases, at 315, UE 115-*c* may determine a PDP, a CIR, or both for the channel based on performing the channel estimation.

At 320, 325, and 330, UE 115-*c* may receive one or more messages from base station 105-*b* indicating one or more taps to be selected to obtain a secret key for encrypting a transmission (e.g., a data message). For example, at 320, UE 115-*c* may receive RRC signaling from base station 105-*b* indicating multiple bitmaps, each bitmap indicating a set of taps. At 325, UE 115-*c* may subsequently receive a MAC-CE from base station 105-*b* indicating one or more bitmaps of the multiple bitmaps. That is, the MAC-CE may down select the multiple bitmaps to a subset of bitmaps. Further, at 330, base station 105-*b* may send a DCI message indicating a single bitmap from the one or more bitmaps indicating the one or more taps to be selected to obtain the secret key.

At 335, UE 115-*c* may select the one or more taps based on receiving the DCI message, the MAC-CE, the RRC signaling, or a combination thereof. In some cases, UE 115-*c* may select the one or more taps from the PDP, the CIR, or both. Base station 105-*c* may transmit the tap indication (e.g., the set of taps indicated by the bitmap) according to a power threshold of the channel being satisfied at base station 105-*b*. That is, base station 105-*b* may select taps based to include in the indication based on a power criterion at base station 105-*b* being met.

In some examples, UE 115-*c* may select the one or more taps according to a threshold value of non-zero taps configured at UE 115-*c*. In some cases, the threshold may be a relatively high value, a relatively low value, or any other defined value. Base station 105-*b* may configure the threshold at UE 115-*c*. In some other examples, UE 115-*c* may select the one or more taps according to a random tap pattern from a set of random tap patterns. UE 115-*c* may transmit an index of the selected random tap pattern to base station 105-*b*.

At 340, UE 115-*c*, base station 105-*b*, or both may obtain the secret key for encrypting a transmission. For example, base station 105-*b*, UE 115-*c*, or both may determine one or more coefficients at a location of the one or more taps. Base station 105-*b*, UE 115-*c*, or both may map one or more taps to the one or more coefficients based on a respective index of each tap of the one or more taps. Base station 105-*b*, UE 115-*c*, or both may quantize the one or more coefficients based on applying a key derivation function to the one or more coefficients to obtain the secret key. In some cases, base station 105-*b*, UE 115-*c*, or both may determine a resource element channel coefficient for one or more channels, where the quantizing is based on the resource element channel coefficient. The one or more coefficients may include an RSRP, a RSRQ, a SIR, a SINR, a tap value, an energy metric, or a combination thereof At 345, UE 115-*c* and base station 105-*b* may communicate signaling with each other. The signaling may include a message that is encrypted with the secret key. The message may be a data message from UE 115-*c* to base station 105-*b*, from base station 105-*b* to UE 115-*c*, or both.

Base station 105-*b*, UE 115-*c*, or both may determine that an SNR for the channel satisfies a threshold based on performing the channel estimation. Base station 105-*b* may configure the threshold at UE 115-*c*. Base station 105-*b*, UE 115-*c*, or both may encrypt the message and one or more repeated pilot signals with the secret key based on the SNR satisfying the threshold (e.g., being below a defined value). Additionally or alternatively, base station 105-*b*, UE 115-*c*, or both may perform a key refinement procedure to obtain a refined secret key based on the SNR satisfying the threshold (e.g., being below a defined value). Base station 105-*b*, UE 115-*c*, or both may encrypt the message with the refined secret key.

In some cases, UE 115-*c*, base station 105-*b*, or both may encrypt one or more fields of the message using the secret key, where the message is communicated over the channel based on the encryption. UE 115-*c* may transmit the signaling including the encrypted message to base station 105-*b*. Additionally or alternatively, UE 115-*c* may receive the signaling including the encrypted message from base station 105-*b*.

FIG. 4 illustrates an example of a process flow 400 in a system that supports tap-domain secret-key generation in accordance with aspects of the present disclosure. In some examples, process flow 400 may implement aspects of wireless communications system 100 and wireless communications system 200. The process flow 400 may illustrate an example of a base station 105-*c* indicating one or more taps in reference signal resources for a UE 115-*d* to obtain a secret key. Base station 105-*c* and UE 115-*d* may be examples of a base station 105 and a UE 115 as described with reference to FIGS. 1 and 2. Alternative examples of the following may be implemented, where some processes are performed in a different order than described or are not performed. In some cases, processes may include additional features not mentioned below, or further processes may be added.

In some examples, the actions described as being performed by a base station 105 may additionally or alternatively be performed by a controlling or primary UE 115 in a sidelink example. Similarly, the actions described as being performed by UE 115-*d* may additionally or alternatively be performed at base station 105-*c*. That is, base station 105-*c* may also perform the process to obtain a secret key for encrypting a message.

At 405, UE 115-*d* may receive one or more reference signals from base station 105-*c* over a channel between UE 115-*d* and base station 105-*c*. The reference signals may include SRSs, CSI-RSs, or the like.

At 410, UE 115-*d* may receive one or more messages from base station 105-*c* indicating one or more taps to be selected to obtain a secret key for encrypting a transmission (e.g., a data message). In some examples, UE 115-*d* may receive the one or more reference signals on one or more resources that include the tap indication for the one or more taps. In some cases, UE 115-*d* may receive a control message from base station 105-*c* configuring a resource pool for sidelink communications with a primary or controlling UE 115, where the resource pool includes the one or more resources configured with one or more bitmaps. At least one bitmap of the one or more bitmaps may indicate the one or more taps. In some cases, a resource configuration for the one or more reference signals may include a bitmap indicating the one or more taps.

At 415, UE 115-*d* may perform channel estimation for the channel based on the one or more reference signals. For example, UE 115-*d* may estimate one or more parameters or metrics related to the channel, such as RSRP, channel power, SINR, phase, or the like. UE 115-*d* may determine multiple taps for the channel based on performing the channel estimation.

In some cases, at 420, UE 115-*d* may determine a PDP, a CIR, or both for the channel based on performing the channel estimation.

At 425, UE 115-*d* may select the one or more taps based on receiving the tap indication. In some cases, UE 115-*d* may select the one or more taps from the PDP, the CIR, or both. Base station 105-*c* may transmit the tap indication (e.g., the set of taps indicated by the reference signal resources) according to a power threshold of the channel being satisfied at base station 105-*c*. That is, base station 105-*c* may select taps based to include in the indication based on a power criterion at base station 105-*c* being met.

In some examples, UE 115-*d* may select the one or more taps according to a threshold value of non-zero taps configured at UE 115-*d*. In some cases, the threshold may be a relatively high value, a relatively low value, or any other defined value. Base station 105-*c* may configure the threshold at UE 115-*d*. In some other examples, UE 115-*d* may select the one or more taps according to a random tap pattern from a set of random tap patterns. UE 115-*d* may transmit an index of the selected random tap pattern to base station 105-*c*.

At 430, UE 115-*d*, base station 105-*c*, or both may obtain the secret key for encrypting a transmission. For example, base station 105-*c*, UE 115-*d*, or both may determine one or more coefficients at a location of the one or more taps. Base station 105-*c*, UE 115-*d*, or both may map one or more taps to the one or more coefficients based on a respective index of each tap of the one or more taps. Base station 105-*c*, UE 115-*d*, or both may quantize the one or more coefficients based on applying a key derivation function to the one or more coefficients to obtain the secret key. In some cases, base station 105-*c*, UE 115-*d*, or both may determine a resource element channel coefficient for one or more channels, where the quantizing is based on the resource element channel coefficient. The one or more coefficients may include an RSRP, a RSRQ, a SIR, a SINR, a tap value, an energy metric, or a combination thereof At 435, UE 115-*d* and base station 105-*c* may communicate signaling with each other. The signaling may include a message that is encrypted with the secret key. The message may be a data message from UE 115-*d* to base station 105-*c*, from base station 105-*c* to UE 115-*d*, or both.

Base station 105-*c*, UE 115-*d*, or both may determine that an SNR for the channel satisfies a threshold based on performing the channel estimation. Base station 105-*c* may configure the threshold at UE 115-*d*. Base station 105-*c*, UE 115-*d*, or both may encrypt the message and one or more repeated pilot signals with the secret key based on the SNR satisfying the threshold (e.g., being below a defined value). Additionally or alternatively, base station 105-*c*, UE 115-*d*, or both may perform a key refinement procedure to obtain a refined secret key based on the SNR satisfying the threshold (e.g., being below a defined value). Base station 105-*c*, UE 115-*d*, or both may encrypt the message with the refined secret key.

In some cases, UE 115-*d*, base station 105-*c*, or both may encrypt one or more fields of the message using the secret key, where the message is communicated over the channel based on the encryption. UE 115-*d* may transmit the signaling including the encrypted message to base station 105-*c*. Additionally or alternatively, UE 115-*d* may receive the signaling including the encrypted message from base station 105-*c*.

Figure 5:
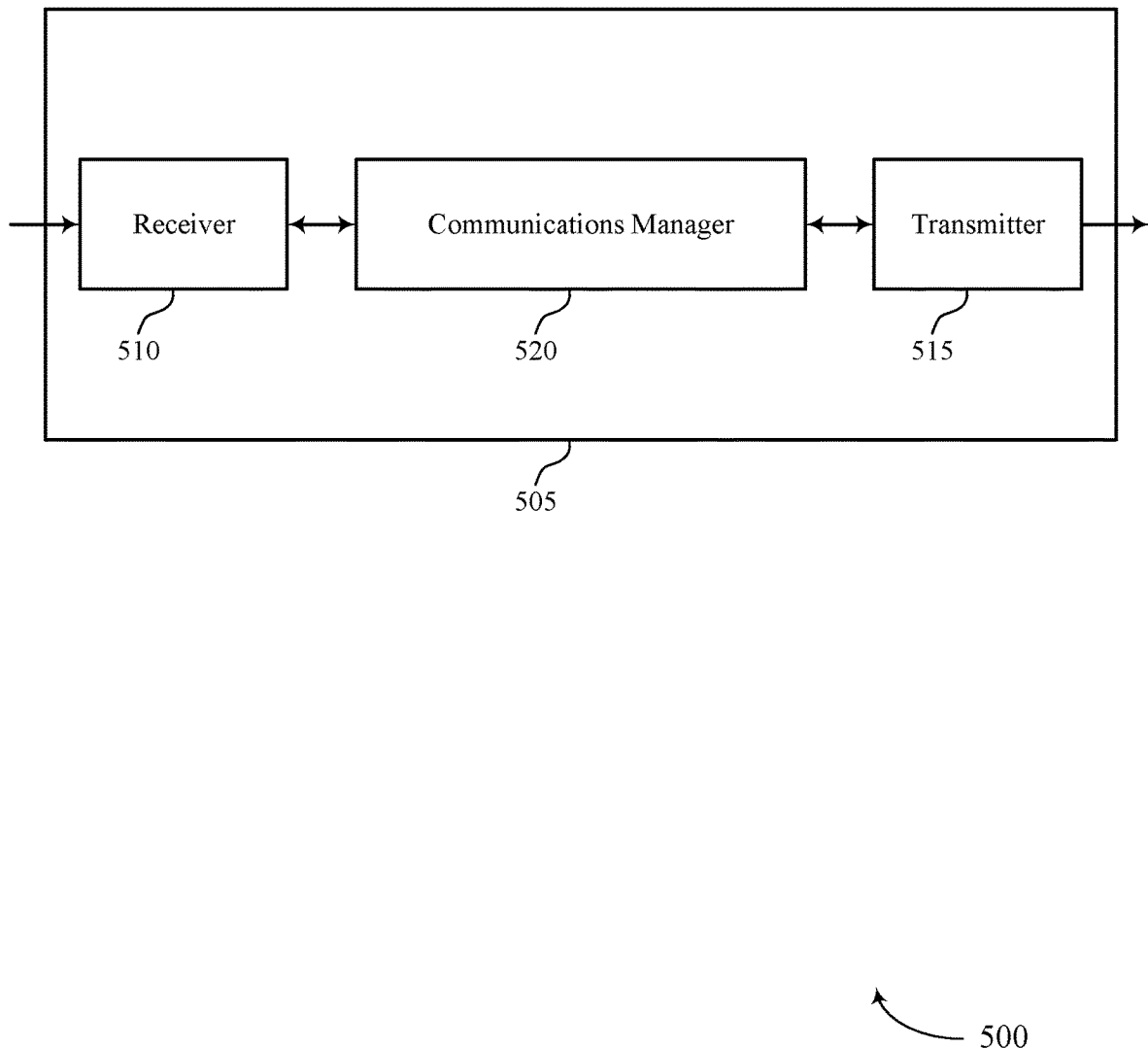
FIGS. 5 and 6 show block diagrams of devices that support tap-domain secret-key generation in accordance with aspects of the present disclosure.

FIG. 5 shows a block diagram 500 of a device 505 that supports tap-domain secret-key generation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to tap-domain secret-key generation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to tap-domain secret-key generation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of tap-domain secret-key generation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. For example, the communications manager 520 may be configured as or otherwise support a means for receiving, from a second wireless device, one or more reference signals over a channel between the first wireless device and the second wireless device. The communications manager 520 may be configured as or otherwise support a means for performing channel estimation for the channel based on the one or more reference signals, where a set of multiple taps associated with the channel are determined based on the channel estimation. The communications manager 520 may be configured as or otherwise support a means for receiving a first message from the second wireless device indicating one or more taps to be selected from the set of multiple taps to obtain a secret key for encrypting a second message. The communications manager 520 may be configured as or otherwise support a means for communicating signaling with the second wireless device, the signaling including the second message that is encrypted with the secret key.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a UE to receive a tap indication from a base station or controlling UE for selecting one or more taps to obtain a secret key for encrypting a message, which may enable reduced processing, reduced power consumption, more efficient utilization of communication resources, and the like.

Figure 6:
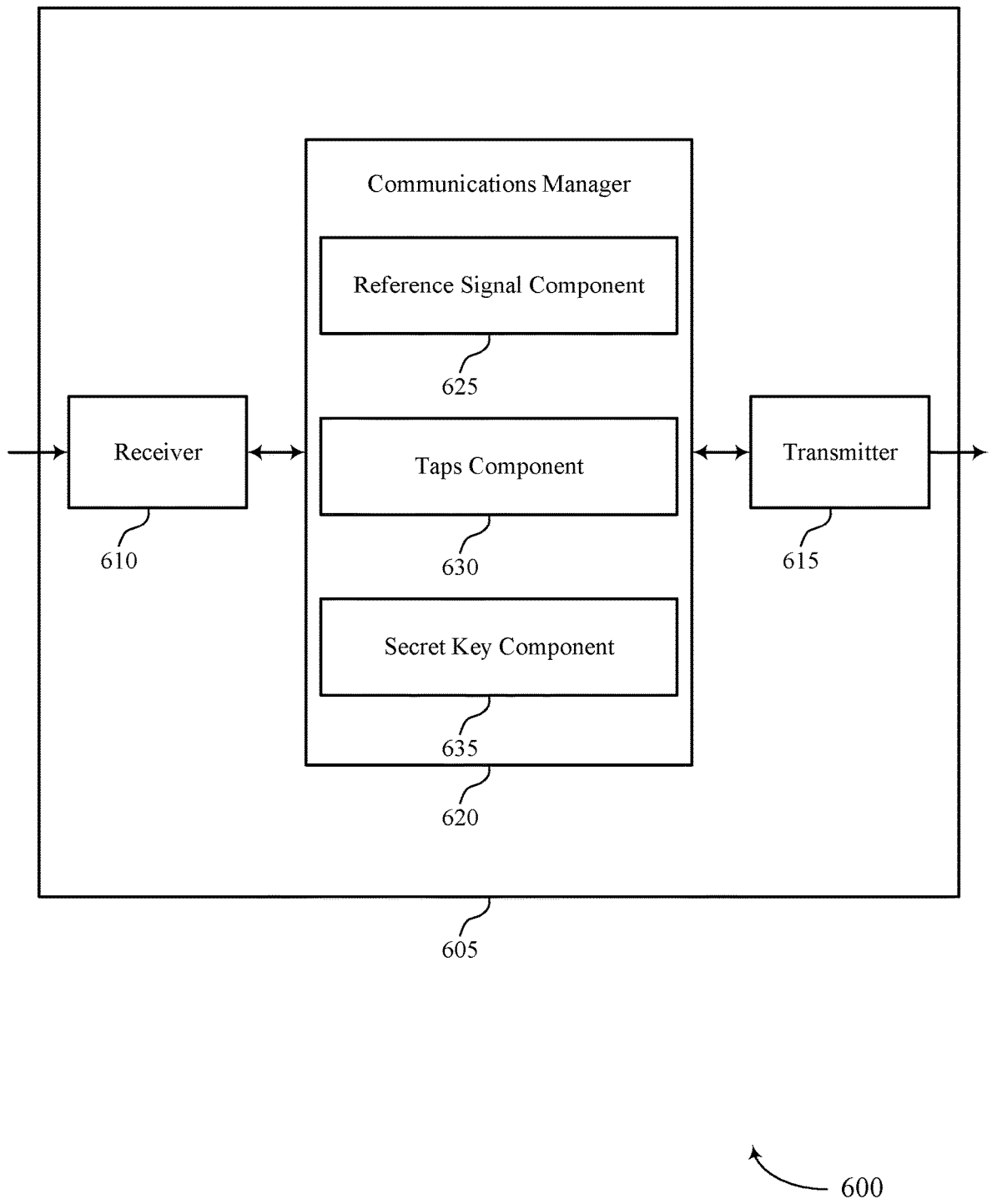

FIG. 6 shows a block diagram 600 of a device 605 that supports tap-domain secret-key generation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to tap-domain secret-key generation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to tap-domain secret-key generation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of tap-domain secret-key generation as described herein. For example, the communications manager 620 may include a reference signal component 625, a taps component 630, a secret key component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. The reference signal component 625 may be configured as or otherwise support a means for receiving, from a second wireless device, one or more reference signals over a channel between the first wireless device and the second wireless device. The taps component 630 may be configured as or otherwise support a means for performing channel estimation for the channel based on the one or more reference signals, where a set of multiple taps associated with the channel are determined based on the channel estimation. The secret key component 635 may be configured as or otherwise support a means for receiving a first message from the second wireless device indicating one or more taps to be selected from the set of multiple taps to obtain a secret key for encrypting a second message. The secret key component 635 may be configured as or otherwise support a means for communicating signaling with the second wireless device, the signaling including the second message that is encrypted with the secret key.

Figure 7:
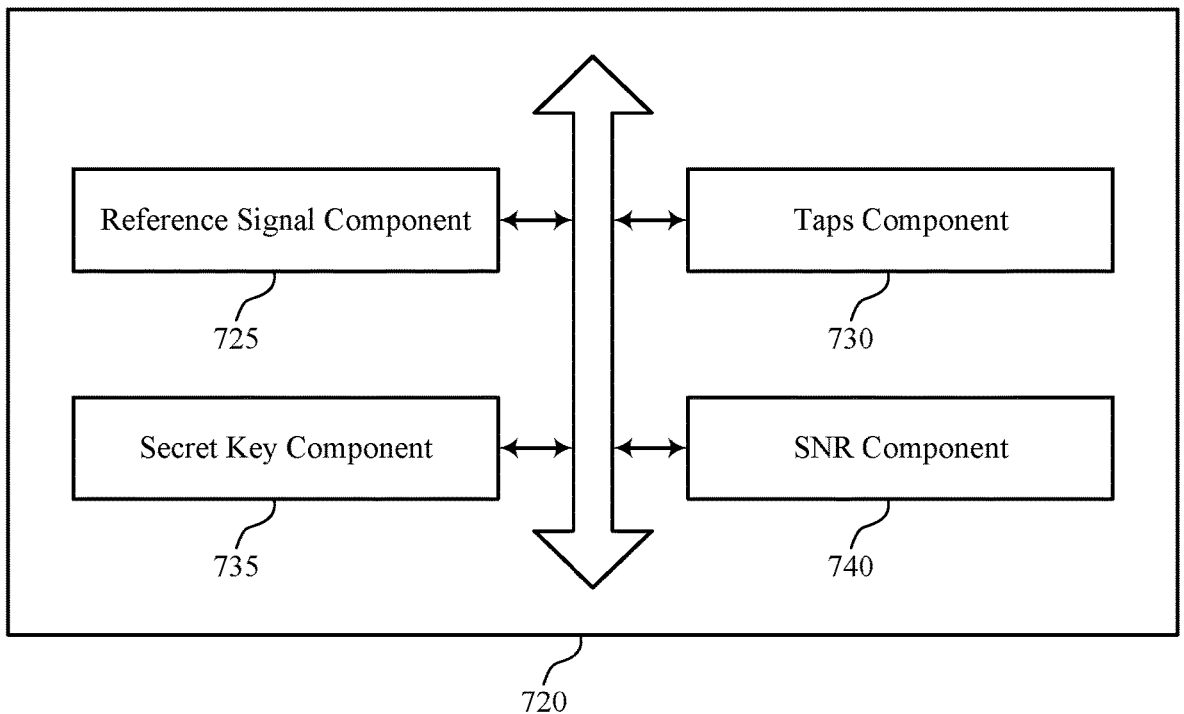
FIG. 7 shows a block diagram of a communications manager that supports tap-domain secret-key generation in accordance with aspects of the present disclosure.

FIG. 7 shows a block diagram 700 of a communications manager 720 that supports tap-domain secret-key generation in accordance with aspects of the present disclosure. The communications manager 720 may be an example of aspects of a communications manager 520, a communications manager 620, or both, as described herein. The communications manager 720, or various components thereof, may be an example of means for performing various aspects of tap-domain secret-key generation as described herein. For example, the communications manager 720 may include a reference signal component 725, a taps component 730, a secret key component 735, an SNR component 740, or any combination thereof. Each of these components may communicate, directly or indirectly, with one another (e.g., via one or more buses).

The communications manager 720 may support wireless communication at a first wireless device in accordance with examples as disclosed herein. The reference signal component 725 may be configured as or otherwise support a means for receiving, from a second wireless device, one or more reference signals over a channel between the first wireless device and the second wireless device. The taps component 730 may be configured as or otherwise support a means for performing channel estimation for the channel based on the one or more reference signals, where a set of multiple taps associated with the channel are determined based on the channel estimation. The secret key component 735 may be configured as or otherwise support a means for receiving a first message from the second wireless device indicating one or more taps to be selected from the set of multiple taps to obtain a secret key for encrypting a second message. In some examples, the secret key component 735 may be configured as or otherwise support a means for communicating signaling with the second wireless device, the signaling including the second message that is encrypted with the secret key.

In some examples, the taps component 730 may be configured as or otherwise support a means for determining a power delay profile, a channel impulse response, or both for the channel based on performing the channel estimation. In some examples, the taps component 730 may be configured as or otherwise support a means for selecting the one or more taps from the power delay profile, the channel impulse response, or a combination thereof based on the channel estimation and the received first message.

In some examples, the first message indicates the one or more taps according to a power threshold corresponding to the channel being satisfied at the second wireless device.

In some examples, the secret key component 735 may be configured as or otherwise support a means for determining one or more coefficients corresponding to a location of the one or more taps, where the secret key is obtained based on the one or more coefficients.

In some examples, the secret key component 735 may be configured as or otherwise support a means for mapping one or more taps to the one or more coefficients based on a respective index of each tap of the one or more taps. In some examples, the secret key component 735 may be configured as or otherwise support a means for quantizing the one or more coefficients based on applying a key derivation function to the one or more coefficients to obtain the secret key.

In some examples, the secret key component 735 may be configured as or otherwise support a means for determining a resource element channel coefficient corresponding to one or more channels, where the quantizing is based on the resource element channel coefficient.

In some examples, the one or more coefficients include a RSRP, a RSRQ, a SIR, a SINR, a tap value, an energy metric, or a combination thereof.

In some examples, the SNR component 740 may be configured as or otherwise support a means for determining that a SNR for the channel satisfies a threshold based on performing the channel estimation. In some examples, the SNR component 740 may be configured as or otherwise support a means for encrypting the second message and one or more repeated pilot signals with the secret key based on the SNR satisfying the threshold.

In some examples, the SNR component 740 may be configured as or otherwise support a means for determining that a SNR for the channel satisfies a threshold based on performing the channel estimation. In some examples, the SNR component 740 may be configured as or otherwise support a means for performing a key refinement procedure to obtain a refined secret key based on the SNR satisfying the threshold, where the second message is encrypted with the refined secret key.

In some examples, the first message includes a bitmap indicating the one or more taps.

In some examples, the taps component 730 may be configured as or otherwise support a means for receiving, prior to receiving the first message, a third message indicating a set of multiple bitmaps including the bitmap, each bitmap indicating a set of taps. In some examples, the taps component 730 may be configured as or otherwise support a means for receiving, prior to receiving the first message and after receiving the third message, a fourth message indicating one or more bitmaps including the bitmap, where the first message includes a downlink control information message, the third message includes radio resource control signaling, and the fourth message includes a medium access control-control element. In some examples, the taps component 730 may be configured as or otherwise support a means for selecting the one or more taps based on receiving the first message, the third message, and the fourth message.

In some examples, to support receiving the first message, the reference signal component 725 may be configured as or otherwise support a means for receiving the one or more reference signals on one or more resources that include the first message.

In some examples, the taps component 730 may be configured as or otherwise support a means for receiving a control message configuring a resource pool for sidelink communications with the second wireless device, where the resource pool includes the one or more resources configured with one or more bitmaps, where at least one bitmap of the one or more bitmaps indicates the one or more taps.

In some examples, a resource configuration for the one or more reference signals includes a bitmap indicating the one or more taps.

In some examples, the taps component 730 may be configured as or otherwise support a means for selecting the one or more taps according to a threshold value of non-zero taps based on the first message, where the threshold value of non-zero taps is configured at the first wireless device.

In some examples, the taps component 730 may be configured as or otherwise support a means for selecting the one or more taps according to a random tap pattern from a set of random tap patterns based on the first message. In some examples, the taps component 730 may be configured as or otherwise support a means for transmitting an index of the random tap pattern to the second wireless device.

In some examples, the secret key component 735 may be configured as or otherwise support a means for encrypting one or more fields of the second message using the secret key, where the second message is communicated over the channel based on the encryption.

In some examples, to support communicating the signaling with the second wireless device, the secret key component 735 may be configured as or otherwise support a means for transmitting the signaling including the second message to the second wireless device. In some examples, to support communicating the signaling with the second wireless device, the secret key component 735 may be configured as or otherwise support a means for receiving the signaling including the second message from the second wireless device.

Figure 8:
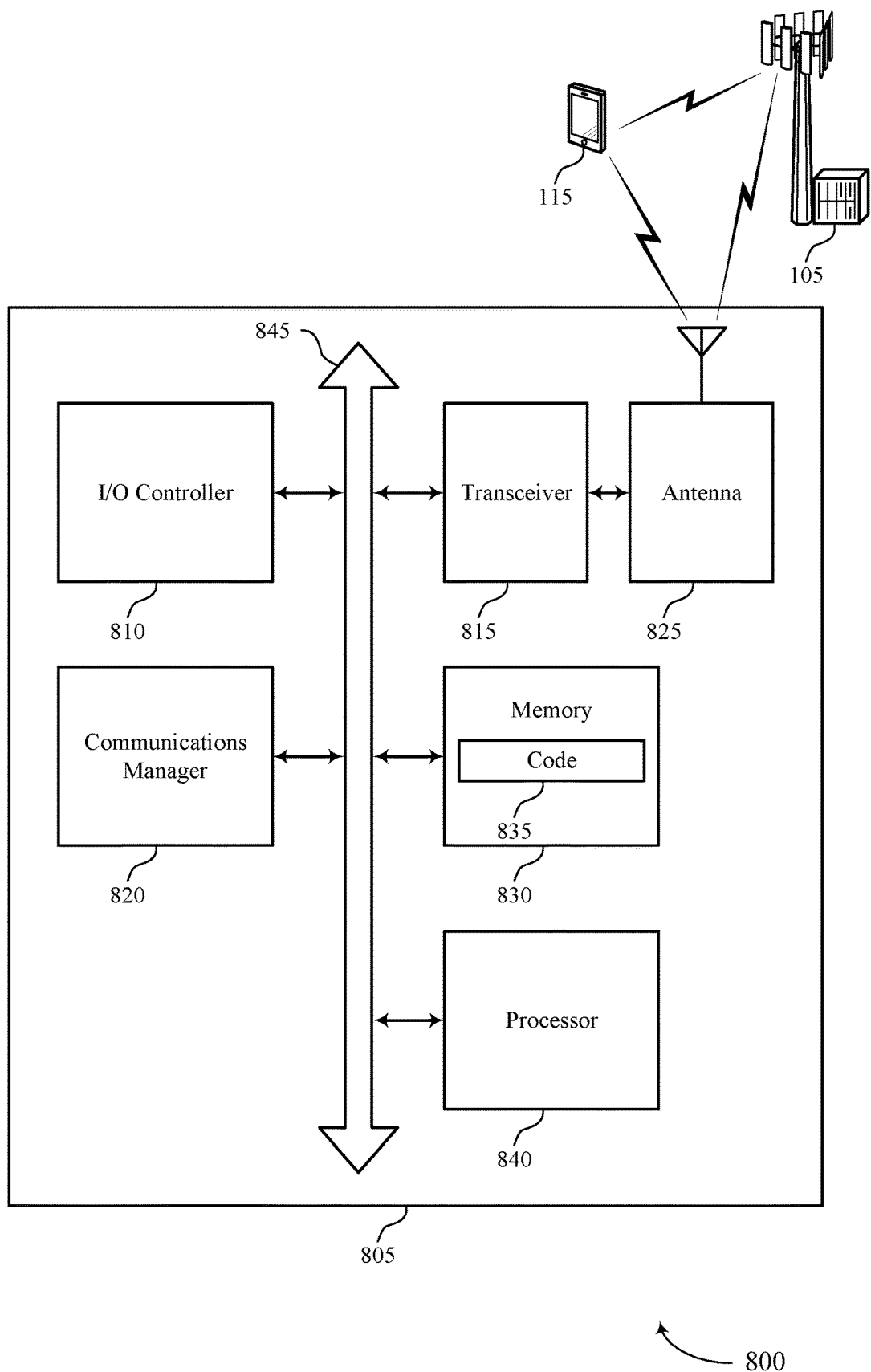
FIG. 8 shows a diagram of a system including a device that supports tap-domain secret-key generation in accordance with aspects of the present disclosure.

FIG. 8 shows a diagram of a system 800 including a device 805 that supports tap-domain secret-key generation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting tap-domain secret-key generation). For example, the device 805 or a component of the device 805 may include a processor 840 and memory 830 coupled to the processor 840, the processor 840 and memory 830 configured to perform various functions described herein.

The communications manager 820 may support wireless communication at a first wireless device in accordance with examples as disclosed herein. For example, the communications manager 820 may be configured as or otherwise support a means for receiving, from a second wireless device, one or more reference signals over a channel between the first wireless device and the second wireless device. The communications manager 820 may be configured as or otherwise support a means for performing channel estimation for the channel based on the one or more reference signals, where a set of multiple taps associated with the channel are determined based on the channel estimation. The communications manager 820 may be configured as or otherwise support a means for receiving a first message from the second wireless device indicating one or more taps to be selected from the set of multiple taps to obtain a secret key for encrypting a second message. The communications manager 820 may be configured as or otherwise support a means for communicating signaling with the second wireless device, the signaling including the second message that is encrypted with the secret key.

By including or configuring the communications manager 820 in accordance with examples as described herein, the device 805 may support techniques for a UE to receive a tap indication from a base station or controlling UE for selecting one or more taps to obtain a secret key for encrypting a message, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of tap-domain secret-key generation as described herein, or the processor 840 and the memory 830 may be otherwise configured to perform or support such operations.

Figure 9:
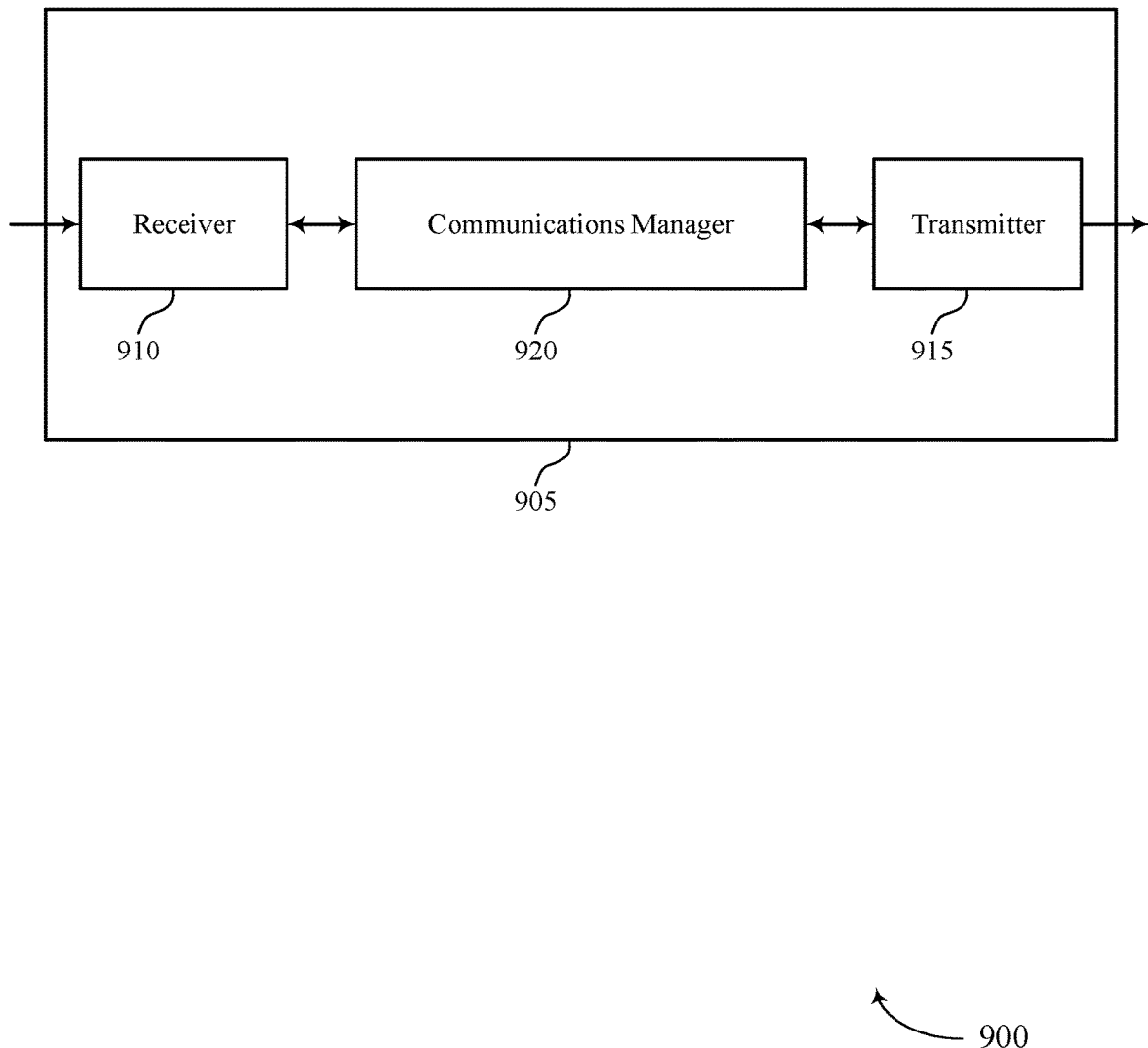
FIGS. 9 and 10 show block diagrams of devices that support tap-domain secret-key generation in accordance with aspects of the present disclosure.

FIG. 9 shows a block diagram 900 of a device 905 that supports tap-domain secret-key generation in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to tap-domain secret-key generation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to tap-domain secret-key generation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of tap-domain secret-key generation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first wireless device in accordance with examples as disclosed herein. For example, the communications manager 920 may be configured as or otherwise support a means for transmitting, to a second wireless device, one or more reference signals over a channel between the first wireless device and the second wireless device. The communications manager 920 may be configured as or otherwise support a means for performing channel estimation for the channel based on the one or more reference signals, where a set of multiple taps associated with the channel are determined based on the channel estimation. The communications manager 920 may be configured as or otherwise support a means for transmitting a first message to the second wireless device indicating one or more taps to be selected from the set of multiple taps to obtain a secret key for encrypting a second message. The communications manager 920 may be configured as or otherwise support a means for communicating signaling with the second wireless device, the signaling including the second message that is encrypted with the secret key.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a UE to receive a tap indication from a base station or controlling UE for selecting one or more taps to obtain a secret key for encrypting a message, which may cause reduced processing, reduced power consumption, more efficient utilization of communication resources, and the like.

Figure 10:
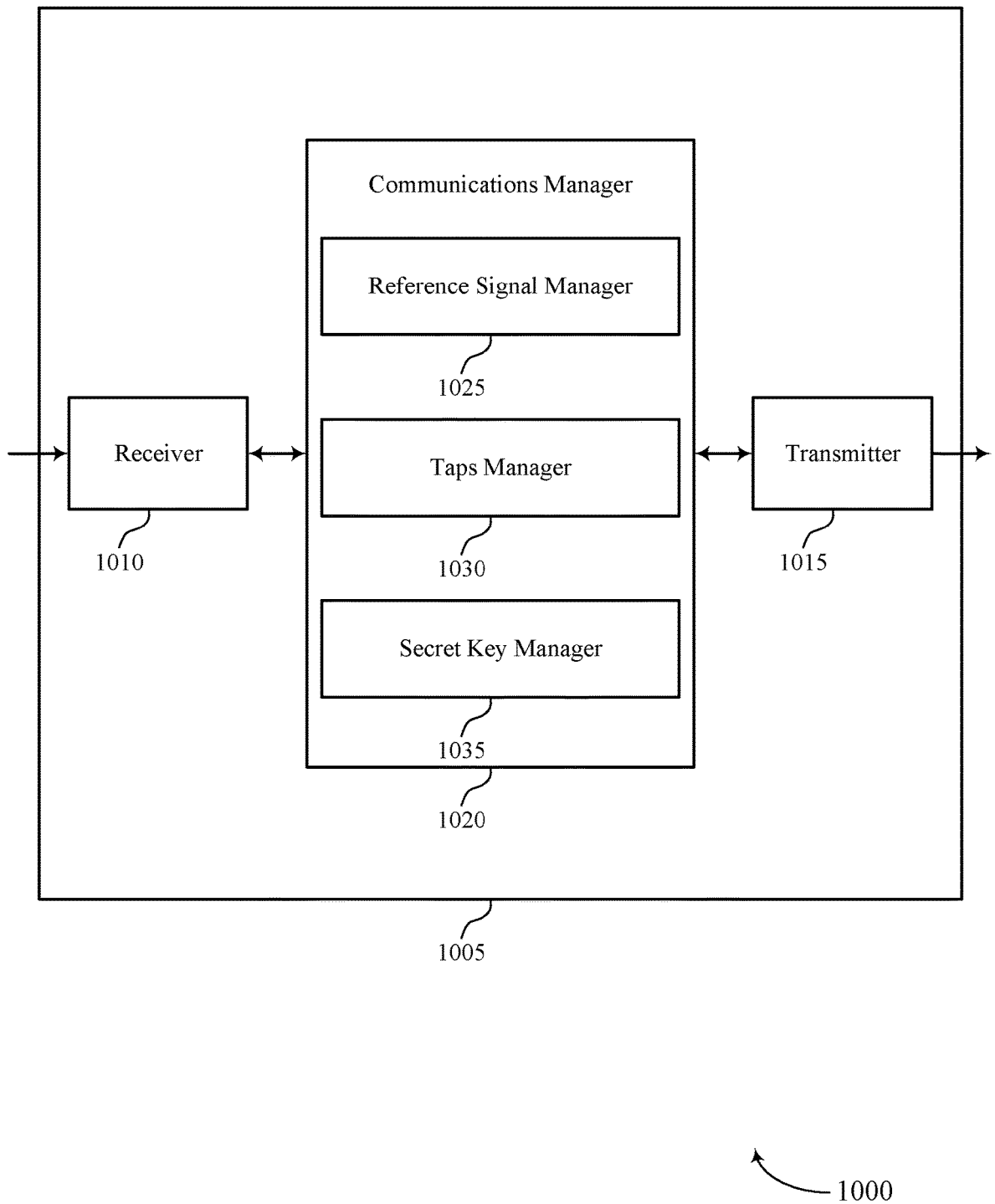

FIG. 10 shows a block diagram 1000 of a device 1005 that supports tap-domain secret-key generation in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to tap-domain secret-key generation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to tap-domain secret-key generation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of tap-domain secret-key generation as described herein. For example, the communications manager 1020 may include a reference signal manager 1025, a taps manager 1030, a secret key manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first wireless device in accordance with examples as disclosed herein. The reference signal manager 1025 may be configured as or otherwise support a means for transmitting, to a second wireless device, one or more reference signals over a channel between the first wireless device and the second wireless device. The taps manager 1030 may be configured as or otherwise support a means for performing channel estimation for the channel based on the one or more reference signals, where a set of multiple taps associated with the channel are determined based on the channel estimation. The secret key manager 1035 may be configured as or otherwise support a means for transmitting a first message to the second wireless device indicating one or more taps to be selected from the set of multiple taps to obtain a secret key for encrypting a second message. The secret key manager 1035 may be configured as or otherwise support a means for communicating signaling with the second wireless device, the signaling including the second message that is encrypted with the secret key.

Figure 11:
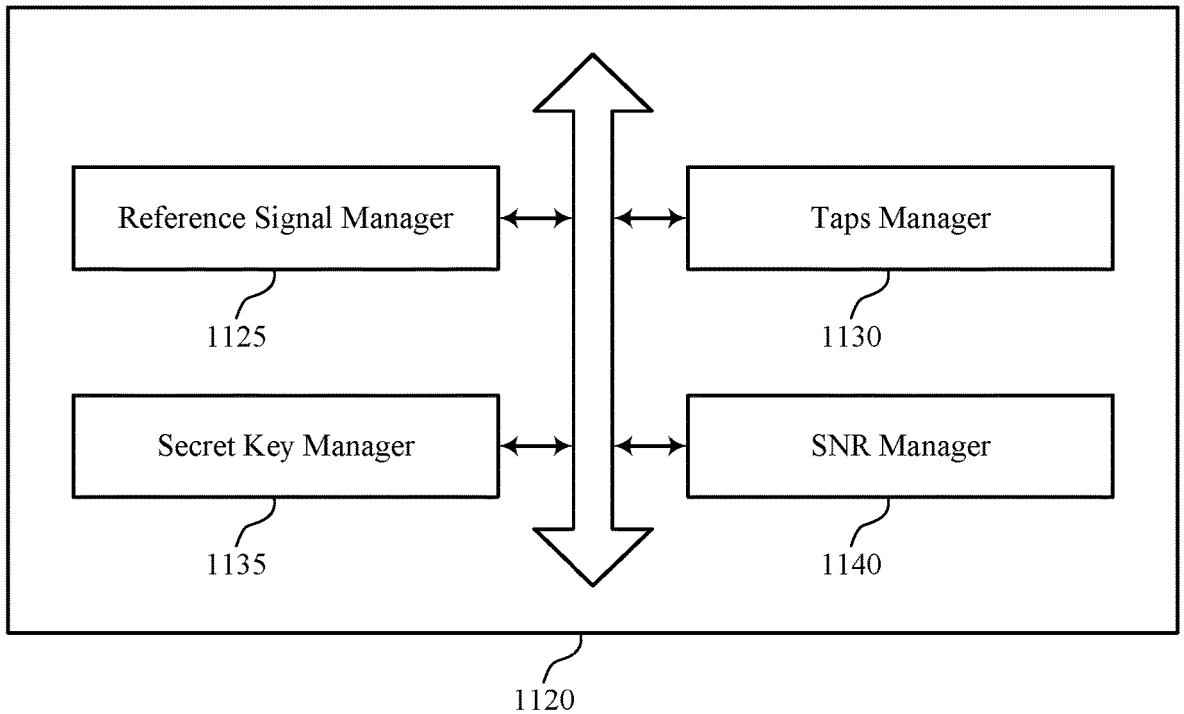
FIG. 11 shows a block diagram of a communications manager that supports tap-domain secret-key generation in accordance with aspects of the present disclosure.

FIG. 11 shows a block diagram 1100 of a communications manager 1120 that supports tap-domain secret-key generation in accordance with aspects of the present disclosure. The communications manager 1120 may be an example of aspects of a communications manager 920, a communications manager 1020, or both, as described herein. The communications manager 1120, or various components thereof, may be an example of means for performing various aspects of tap-domain secret-key generation as described herein. For example, the communications manager 1120 may include a reference signal manager 1125, a taps manager 1130, a secret key manager 1135, an SNR manager 1140, or any combination thereof. Each of these components may communicate, directly or indirectly, with one another (e.g., via one or more buses).

The communications manager 1120 may support wireless communication at a first wireless device in accordance with examples as disclosed herein. The reference signal manager 1125 may be configured as or otherwise support a means for transmitting, to a second wireless device, one or more reference signals over a channel between the first wireless device and the second wireless device. The taps manager 1130 may be configured as or otherwise support a means for performing channel estimation for the channel based on the one or more reference signals, where a set of multiple taps associated with the channel are determined based on the channel estimation. The secret key manager 1135 may be configured as or otherwise support a means for transmitting a first message to the second wireless device indicating one or more taps to be selected from the set of multiple taps to obtain a secret key for encrypting a second message. In some examples, the secret key manager 1135 may be configured as or otherwise support a means for communicating signaling with the second wireless device, the signaling including the second message that is encrypted with the secret key.

In some examples, the taps manager 1130 may be configured as or otherwise support a means for determining a power delay profile, a channel impulse response, or both for the channel based on performing the channel estimation. In some examples, the taps manager 1130 may be configured as or otherwise support a means for selecting the one or more taps to indicate in the first message from the power delay profile, the channel impulse response, or a combination thereof based on the channel estimation and the received first message.

In some examples, the first message indicates the one or more taps according to a power threshold corresponding to the channel being satisfied at the second wireless device.

In some examples, the secret key manager 1135 may be configured as or otherwise support a means for determining one or more coefficients corresponding to a location of the one or more taps, where the secret key is obtained based on the one or more coefficients.

In some examples, the secret key manager 1135 may be configured as or otherwise support a means for mapping one or more taps to the one or more coefficients based on a respective index of each tap of the one or more taps. In some examples, the secret key manager 1135 may be configured as or otherwise support a means for quantizing the one or more coefficients based on applying a key derivation function to the one or more coefficients to obtain the secret key.

In some examples, the SNR manager 1140 may be configured as or otherwise support a means for determining that a SNR for the channel satisfies a threshold based on performing the channel estimation. In some examples, the SNR manager 1140 may be configured as or otherwise support a means for encrypting the second message and one or more repeated pilot signals with the secret key based on the SNR satisfying the threshold.

In some examples, the SNR manager 1140 may be configured as or otherwise support a means for determining that a SNR for the channel satisfies a threshold based on performing the channel estimation. In some examples, the SNR manager 1140 may be configured as or otherwise support a means for performing a key refinement procedure to obtain a refined secret key based on the SNR satisfying the threshold, where the second message is encrypted with the refined secret key.

In some examples, the first message includes a bitmap indicating the one or more taps, and the taps manager 1130 may be configured as or otherwise support a means for transmitting, prior to transmitting the first message, a third message indicating a set of multiple bitmaps including the bitmap, each bitmap indicating a set of taps. In some examples, the first message includes a bitmap indicating the one or more taps, and the taps manager 1130 may be configured as or otherwise support a means for transmitting, prior to transmitting the first message and after transmitting the third message, a fourth message indicating one or more bitmaps including the bitmap, where the first message includes a downlink control information message, the third message includes radio resource control signaling, and the fourth message includes a medium access control-control element, where indicating the one or more taps is based on transmitting the first message, the third message, and the fourth message.

In some examples, the taps manager 1130 may be configured as or otherwise support a means for determining a threshold value of non-zero taps for the second wireless device. In some examples, the taps manager 1130 may be configured as or otherwise support a means for selecting the one or more taps to indicate in the first message according to the threshold value of non-zero taps.

In some examples, the taps manager 1130 may be configured as or otherwise support a means for receiving, from the second wireless device, an index of a random tap pattern from a set of random tap patterns, where the first message includes the set of random tap patterns.

Figure 12:
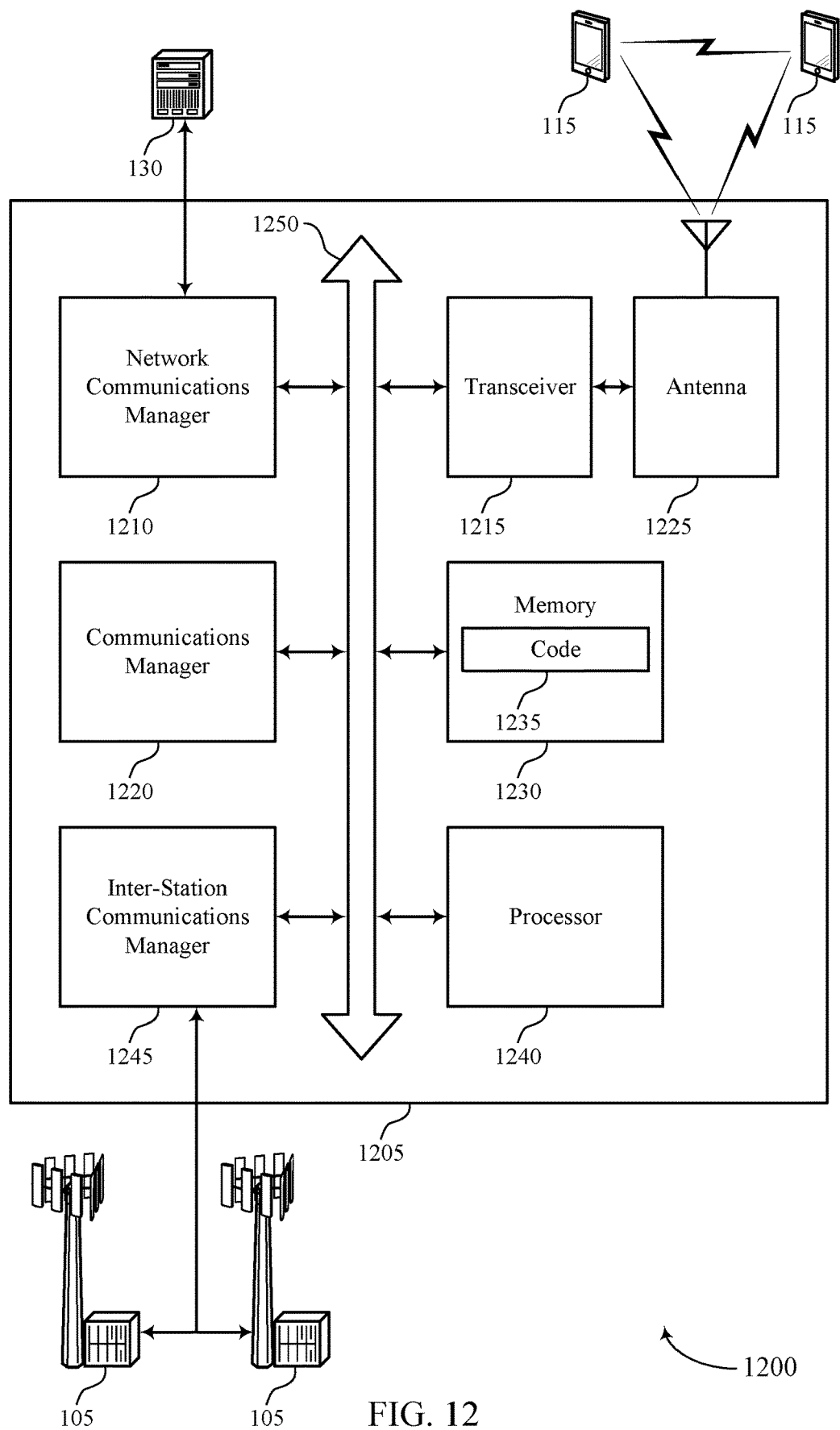
FIG. 12 shows a diagram of a system including a device that supports tap-domain secret-key generation in accordance with aspects of the present disclosure.

FIG. 12 shows a diagram of a system 1200 including a device 1205 that supports tap-domain secret-key generation in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting tap-domain secret-key generation). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a first wireless device in accordance with examples as disclosed herein. For example, the communications manager 1220 may be configured as or otherwise support a means for transmitting, to a second wireless device, one or more reference signals over a channel between the first wireless device and the second wireless device. The communications manager 1220 may be configured as or otherwise support a means for performing channel estimation for the channel based on the one or more reference signals, where a set of multiple taps associated with the channel are determined based on the channel estimation. The communications manager 1220 may be configured as or otherwise support a means for transmitting a first message to the second wireless device indicating one or more taps to be selected from the set of multiple taps to obtain a secret key for encrypting a second message. The communications manager 1220 may be configured as or otherwise support a means for communicating signaling with the second wireless device, the signaling including the second message that is encrypted with the secret key.

By including or configuring the communications manager 1220 in accordance with examples as described herein, the device 1205 may support techniques for a UE to receive a tap indication from a base station or controlling UE for selecting one or more taps to obtain a secret key for encrypting a message, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of tap-domain secret-key generation as described herein, or the processor 1240 and the memory 1230 may be otherwise configured to perform or support such operations.

Figure 13:
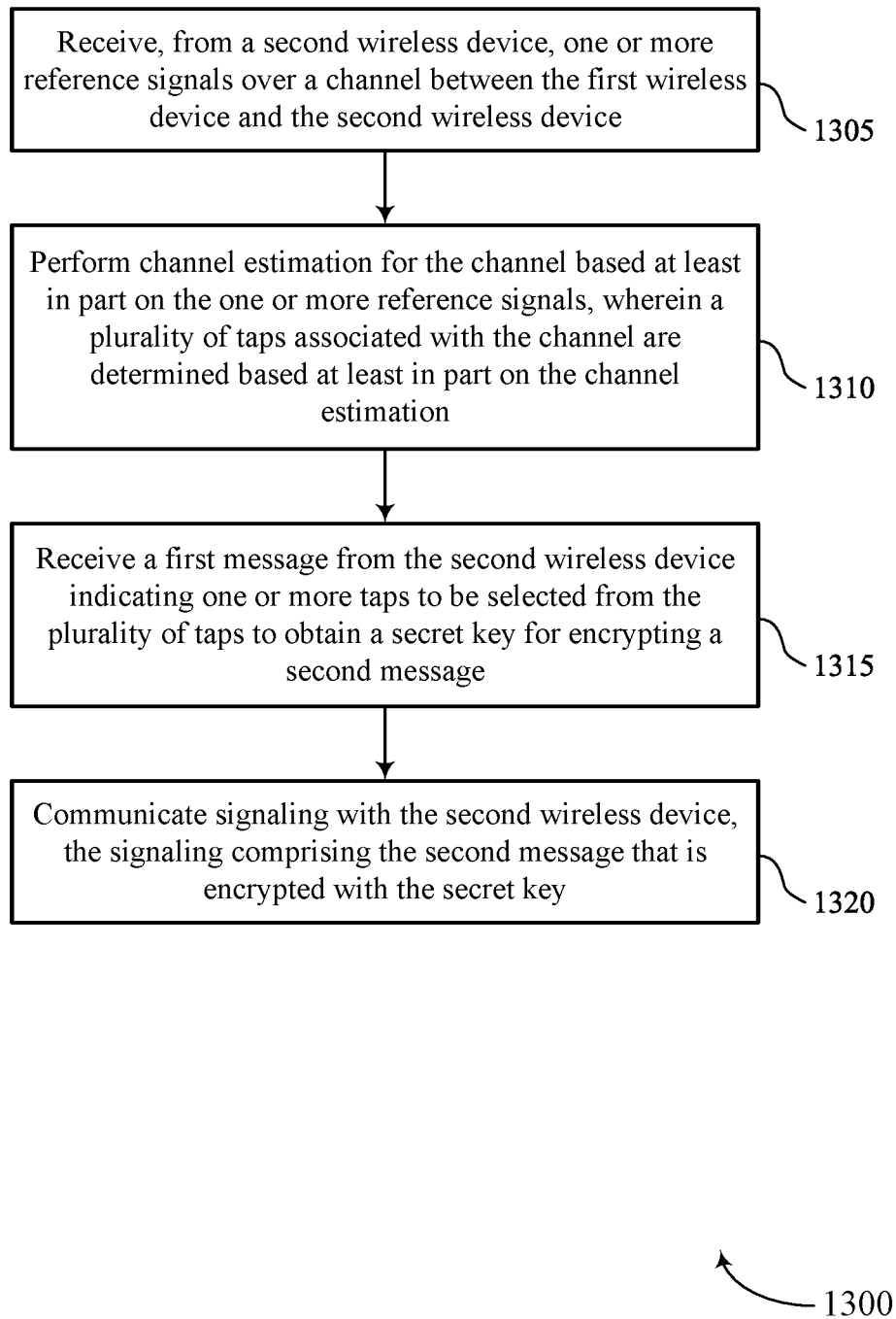
FIGS. 13 through 16 show flowcharts illustrating methods that support tap-domain secret-key generation in accordance with aspects of the present disclosure.

FIG. 13 shows a flowchart illustrating a method 1300 that supports tap-domain secret-key generation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a second wireless device, one or more reference signals over a channel between the first wireless device and the second wireless device. The operations of 1305 may be performed in accordance with examples as disclosed herein. In some examples, aspects of the operations of 1305 may be performed by a reference signal component 725 as described with reference to FIG. 7.

At 1310, the method may include performing channel estimation for the channel based on the one or more reference signals, where a set of multiple taps associated with the channel are determined based on the channel estimation. The operations of 1310 may be performed in accordance with examples as disclosed herein. In some examples, aspects of the operations of 1310 may be performed by a taps component 730 as described with reference to FIG. 7.

At 1315, the method may include receiving a first message from the second wireless device indicating one or more taps to be selected from the set of multiple taps to obtain a secret key for encrypting a second message. The operations of 1315 may be performed in accordance with examples as disclosed herein. In some examples, aspects of the operations of 1315 may be performed by a secret key component 735 as described with reference to FIG. 7.

At 1320, the method may include communicating signaling with the second wireless device, the signaling including the second message that is encrypted with the secret key. The operations of 1320 may be performed in accordance with examples as disclosed herein. In some examples, aspects of the operations of 1320 may be performed by a secret key component 735 as described with reference to FIG. 7.

Figure 14:
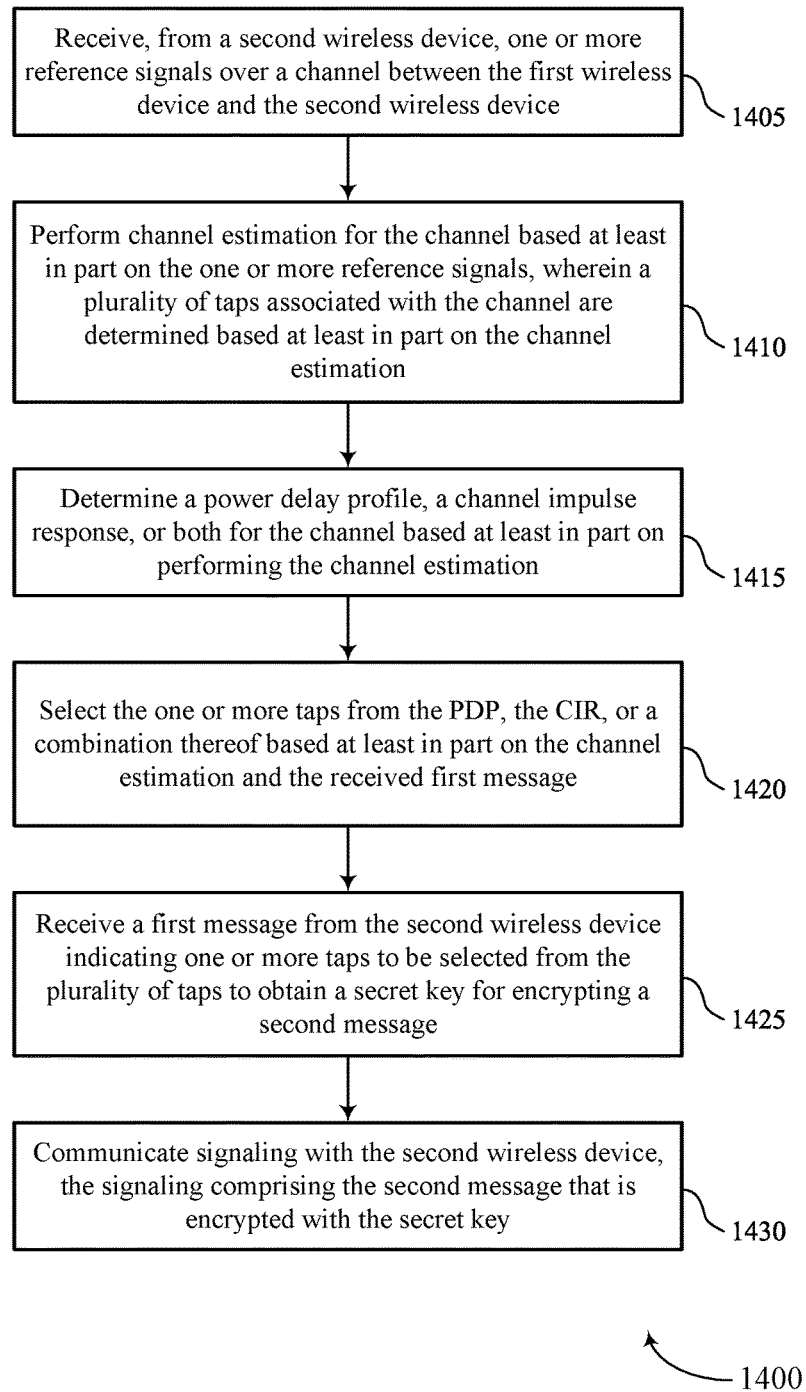

FIG. 14 shows a flowchart illustrating a method 1400 that supports tap-domain secret-key generation in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a second wireless device, one or more reference signals over a channel between the first wireless device and the second wireless device. The operations of 1405 may be performed in accordance with examples as disclosed herein. In some examples, aspects of the operations of 1405 may be performed by a reference signal component 725 as described with reference to FIG. 7.

At 1410, the method may include performing channel estimation for the channel based on the one or more reference signals, where a set of multiple taps associated with the channel are determined based on the channel estimation. The operations of 1410 may be performed in accordance with examples as disclosed herein. In some examples, aspects of the operations of 1410 may be performed by a taps component 730 as described with reference to FIG. 7.

At 1415, the method may include determining a power delay profile, a channel impulse response, or both for the channel based on performing the channel estimation. The operations of 1415 may be performed in accordance with examples as disclosed herein. In some examples, aspects of the operations of 1415 may be performed by a taps component 730 as described with reference to FIG. 7.

At 1420, the method may include selecting the one or more taps from the power delay profile, the channel impulse response, or a combination thereof based on the channel estimation and the received first message. The operations of 1420 may be performed in accordance with examples as disclosed herein. In some examples, aspects of the operations of 1420 may be performed by a taps component 730 as described with reference to FIG. 7.

At 1425, the method may include receiving a first message from the second wireless device indicating one or more taps to be selected from the set of multiple taps to obtain a secret key for encrypting a second message. The operations of 1425 may be performed in accordance with examples as disclosed herein. In some examples, aspects of the operations of 1425 may be performed by a secret key component 735 as described with reference to FIG. 7.

At 1430, the method may include communicating signaling with the second wireless device, the signaling including the second message that is encrypted with the secret key. The operations of 1430 may be performed in accordance with examples as disclosed herein. In some examples, aspects of the operations of 1430 may be performed by a secret key component 735 as described with reference to FIG. 7.

Figure 15:
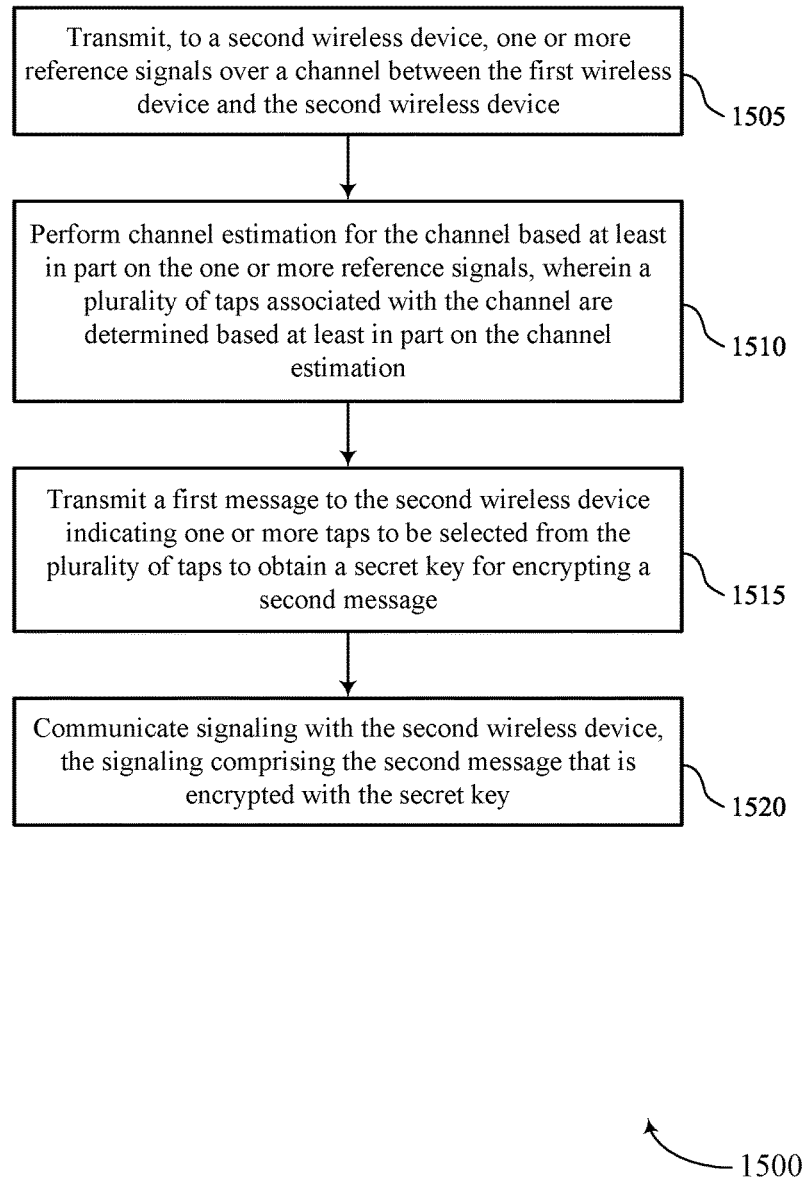

FIG. 15 shows a flowchart illustrating a method 1500 that supports tap-domain secret-key generation in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a second wireless device, one or more reference signals over a channel between the first wireless device and the second wireless device. The operations of 1505 may be performed in accordance with examples as disclosed herein. In some examples, aspects of the operations of 1505 may be performed by a reference signal manager 1125 as described with reference to FIG. 11.

At 1510, the method may include performing channel estimation for the channel based on the one or more reference signals, where a set of multiple taps associated with the channel are determined based on the channel estimation. The operations of 1510 may be performed in accordance with examples as disclosed herein. In some examples, aspects of the operations of 1510 may be performed by a taps manager 1130 as described with reference to FIG. 11.

At 1515, the method may include transmitting a first message to the second wireless device indicating one or more taps to be selected from the set of multiple taps to obtain a secret key for encrypting a second message. The operations of 1515 may be performed in accordance with examples as disclosed herein. In some examples, aspects of the operations of 1515 may be performed by a secret key manager 1135 as described with reference to FIG. 11.

At 1520, the method may include communicating signaling with the second wireless device, the signaling including the second message that is encrypted with the secret key. The operations of 1520 may be performed in accordance with examples as disclosed herein. In some examples, aspects of the operations of 1520 may be performed by a secret key manager 1135 as described with reference to FIG. 11.

Figure 16:
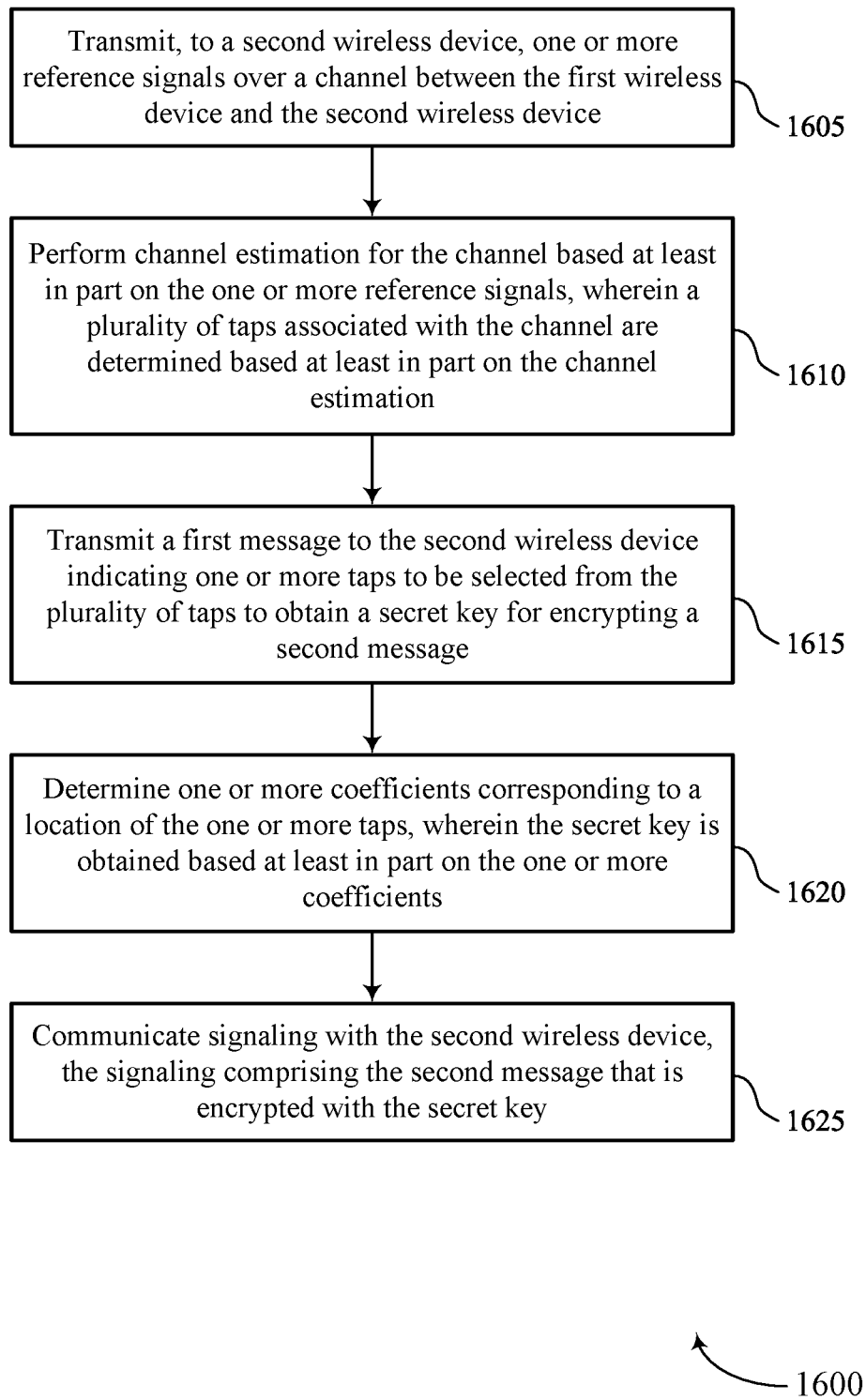

FIG. 16 shows a flowchart illustrating a method 1600 that supports tap-domain secret-key generation in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a second wireless device, one or more reference signals over a channel between the first wireless device and the second wireless device. The operations of 1605 may be performed in accordance with examples as disclosed herein. In some examples, aspects of the operations of 1605 may be performed by a reference signal manager 1125 as described with reference to FIG. 11.

At 1610, the method may include performing channel estimation for the channel based on the one or more reference signals, where a set of multiple taps associated with the channel are determined based on the channel estimation. The operations of 1610 may be performed in accordance with examples as disclosed herein. In some examples, aspects of the operations of 1610 may be performed by a taps manager 1130 as described with reference to FIG. 11.

At 1615, the method may include transmitting a first message to the second wireless device indicating one or more taps to be selected from the set of multiple taps to obtain a secret key for encrypting a second message. The operations of 1615 may be performed in accordance with examples as disclosed herein. In some examples, aspects of the operations of 1615 may be performed by a secret key manager 1135 as described with reference to FIG. 11.

At 1620, the method may include determining one or more coefficients corresponding to a location of the one or more taps, where the secret key is obtained based on the one or more coefficients. The operations of 1620 may be performed in accordance with examples as disclosed herein. In some examples, aspects of the operations of 1620 may be performed by a secret key manager 1135 as described with reference to FIG. 11.

At 1625, the method may include communicating signaling with the second wireless device, the signaling including the second message that is encrypted with the secret key. The operations of 1625 may be performed in accordance with examples as disclosed herein. In some examples, aspects of the operations of 1625 may be performed by a secret key manager 1135 as described with reference to FIG. 11.

The following provides an overview of aspects of the present disclosure:

Aspect 1: A method for wireless communication at a first wireless device, comprising: receiving, from a second wireless device, one or more reference signals over a channel between the first wireless device and the second wireless device; performing channel estimation for the channel based at least in part on the one or more reference signals, wherein a plurality of taps associated with the channel are determined based at least in part on the channel estimation; receiving a first message from the second wireless device indicating one or more taps to be selected from the plurality of taps to obtain a secret key for encrypting a second message; and communicating signaling with the second wireless device, the signaling comprising the second message that is encrypted with the secret key.

Aspect 2: The method of aspect 1 further comprising: determining a power delay profile, a channel impulse response, or both for the channel based at least in part on performing the channel estimation; and selecting the one or more taps from the power delay profile, the channel impulse response, or a combination thereof based at least in part on the channel estimation and the received first message.

Aspect 3: The method of aspect 2, wherein the first message indicates the one or more taps according to a power threshold corresponding to the channel being satisfied at the second wireless device.

Aspect 4: The method of any of aspects 1 through 3 further comprising: determining one or more coefficients corresponding to a location of the one or more taps, wherein the secret key is obtained based at least in part on the one or more coefficients.

Aspect 5: The method of aspect 4 further comprising: mapping one or more taps to the one or more coefficients based at least in part on a respective index of each tap of the one or more taps; and quantizing the one or more coefficients based at least in part on applying a key derivation function to the one or more coefficients to obtain the secret key.

Aspect 6: The method of aspect 5 further comprising: determining a resource element channel coefficient corresponding to one or more channels, wherein the quantizing is based at least in part on the resource element channel coefficient.

Aspect 7: The method of any of aspects 4 through 6, wherein the one or more coefficients comprise a reference signal received power, a reference signal received quality, a signal-to-interference ratio, a signal-to-interference and noise ratio, a tap value, an energy metric, or a combination thereof.

Aspect 8: The method of any of aspects 1 through 7 further comprising: determining that a signal-to-noise ratio for the channel satisfies a threshold based at least in part on performing the channel estimation; and encrypting the second message and one or more repeated pilot signals with the secret key based at least in part on the signal-to-noise ratio satisfying the threshold.

Aspect 9: The method of any of aspects 1 through 8 further comprising: determining that a signal-to-noise ratio for the channel satisfies a threshold based at least in part on performing the channel estimation; performing a key refinement procedure to obtain a refined secret key based at least in part on the signal-to-noise ratio satisfying the threshold, wherein the second message is encrypted with the refined secret key.

Aspect 10: The method of any of aspects 1 through 9, wherein the first message comprises a bitmap indicating the one or more taps.

Aspect 11: The method of aspect 10 further comprising: receiving, prior to receiving the first message, a third message indicating a plurality of bitmaps comprising the bitmap, each bitmap indicating a set of taps; receiving, prior to receiving the first message and after receiving the third message, a fourth message indicating one or more bitmaps comprising the bitmap, wherein the first message comprises a downlink control information message, the third message comprises radio resource control signaling, and the fourth message comprises a medium access control-control element; and selecting the one or more taps based at least in part on receiving the first message, the third message, and the fourth message.

Aspect 12: The method of any of aspects 1 through 11, wherein receiving the first message comprises: receiving the one or more reference signals on one or more resources that include the first message.

Aspect 13: The method of aspect 12 further comprising: receiving a control message configuring a resource pool for sidelink communications with the second wireless device, wherein the resource pool comprises the one or more resources configured with one or more bitmaps, wherein at least one bitmap of the one or more bitmaps indicates the one or more taps.

Aspect 14: The method of any of aspects 12 through 13, wherein a resource configuration for the one or more reference signals comprises a bitmap indicating the one or more taps.

Aspect 15: The method of any of aspects 1 through 14 further comprising: selecting the one or more taps according to a threshold value of non-zero taps based at least in part on the first message, wherein the threshold value of non-zero taps is configured at the first wireless device.

Aspect 16: The method of any of aspects 1 through 15 further comprising: selecting the one or more taps according to a random tap pattern from a set of random tap patterns based at least in part on the first message; and transmitting an index of the random tap pattern to the second wireless device.

Aspect 17: The method of any of aspects 1 through 16 further comprising: encrypting one or more fields of the second message using the secret key, wherein the second message is communicated over the channel based at least in part on the encryption.

Aspect 18: The method of any of aspects 1 through 17, wherein communicating the signaling with the second wireless device comprises: transmitting the signaling comprising the second message to the second wireless device; or receiving the signaling comprising the second message from the second wireless device.

Aspect 19: A method for wireless communication at a first wireless device, comprising: transmitting, to a second wireless device, one or more reference signals over a channel between the first wireless device and the second wireless device; performing channel estimation for the channel based at least in part on the one or more reference signals, wherein a plurality of taps associated with the channel are determined based at least in part on the channel estimation; transmitting a first message to the second wireless device indicating one or more taps to be selected from the plurality of taps to obtain a secret key for encrypting a second message; and communicating signaling with the second wireless device, the signaling comprising the second message that is encrypted with the secret key.

Aspect 20: The method of aspect 19 further comprising: determining a power delay profile, a channel impulse response, or both for the channel based at least in part on performing the channel estimation; and selecting the one or more taps to indicate in the first message from the power delay profile, the channel impulse response, or a combination thereof based at least in part on the channel estimation and the received first message.

Aspect 21: The method of aspect 20, wherein the first message indicates the one or more taps according to a power threshold corresponding to the channel being satisfied at the second wireless device.

Aspect 22: The method of any of aspects 19 through 21 further comprising: determining one or more coefficients corresponding to a location of the one or more taps, wherein the secret key is obtained based at least in part on the one or more coefficients.

Aspect 23: The method of aspect 22 further comprising: mapping one or more taps to the one or more coefficients based at least in part on a respective index of each tap of the one or more taps; and quantizing the one or more coefficients based at least in part on applying a key derivation function to the one or more coefficients to obtain the secret key.

Aspect 24: The method of any of aspects 19 through 23 further comprising: determining that a signal-to-noise ratio for the channel satisfies a threshold based at least in part on performing the channel estimation; and encrypting the second message and one or more repeated pilot signals with the secret key based at least in part on the signal-to-noise ratio satisfying the threshold.

Aspect 25: The method of any of aspects 19 through 24 further comprising: determining that a signal-to-noise ratio for the channel satisfies a threshold based at least in part on performing the channel estimation; performing a key refinement procedure to obtain a refined secret key based at least in part on the signal-to-noise ratio satisfying the threshold, wherein the second message is encrypted with the refined secret key.

Aspect 26: The method of any of aspects 19 through 25, wherein the first message comprises a bitmap indicating the one or more taps, the method further comprising: transmitting, prior to transmitting the first message, a third message indicating a plurality of bitmaps comprising the bitmap, each bitmap indicating a set of taps; transmitting, prior to transmitting the first message and after transmitting the third message, a fourth message indicating one or more bitmaps comprising the bitmap, wherein the first message comprises a downlink control information message, the third message comprises radio resource control signaling, and the fourth message comprises a medium access control-control element, wherein indicating the one or more taps is based at least in part on transmitting the first message, the third message, and the fourth message.

Aspect 27: The method of any of aspects 19 through 26 further comprising: determining a threshold value of non-zero taps for the second wireless device; and selecting the one or more taps to indicate in the first message according to the threshold value of non-zero taps.

Aspect 28: The method of any of aspects 19 through 27 further comprising: receiving, from the second wireless device, an index of a random tap pattern from a set of random tap patterns, wherein the first message comprises the set of random tap patterns.

Aspect 29: An apparatus for wireless communication at a first wireless device, comprising a processor; memory coupled with the processor; and instructions stored in the memory and executable by the processor to cause the apparatus to perform a method of any of aspects 1 through 18.

Aspect 30: An apparatus for wireless communication at a first wireless device, comprising at least one means for performing a method of any of aspects 1 through 18.

Aspect 31: A non-transitory computer-readable medium storing code for wireless communication at a first wireless device, the code comprising instructions executable by a processor to perform a method of any of aspects 1 through 18.

Aspect 32: An apparatus for wireless communication at a first wireless device, comprising a processor; memory coupled with the processor; and instructions stored in the memory and executable by the processor to cause the apparatus to perform a method of any of aspects 19 through 28.

Aspect 33: An apparatus for wireless communication at a first wireless device, comprising at least one means for performing a method of any of aspects 19 through 28.

Aspect 34: A non-transitory computer-readable medium storing code for wireless communication at a first wireless device, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
    receiving, from a second wireless device, one or more reference signals over a channel between the first wireless device and the second wireless device;
    performing channel estimation for the channel based at least in part on the one or more reference signals, wherein a plurality of taps associated with the channel are determined based at least in part on the channel estimation;
    receiving a first message from the second wireless device indicating one or more taps to be selected from the plurality of taps to obtain a secret key for encrypting a second message, wherein each tap of the plurality of taps corresponds to a different path between the first wireless device and the second wireless device; and
    communicating signaling with the second wireless device, the signaling comprising the second message that is encrypted with the secret key.

2. The method of claim 1 further comprising:
    determining a power delay profile, a channel impulse response, or both for the channel based at least in part on performing the channel estimation; and
    selecting the one or more taps from the power delay profile, the channel impulse response, or a combination thereof based at least in part on the channel estimation and the received first message.

3. The method of claim 2, wherein the first message indicates the one or more taps according to a power threshold corresponding to the channel being satisfied at the second wireless device.

4. The method of claim 1 further comprising:
    determining one or more coefficients corresponding to a location of the one or more taps, wherein the secret key is obtained based at least in part on the one or more coefficients.

5. The method of claim 4 further comprising:
    mapping one or more taps to the one or more coefficients based at least in part on a respective index of each tap of the one or more taps; and
    quantizing the one or more coefficients based at least in part on applying a key derivation function to the one or more coefficients to obtain the secret key.

6. The method of claim 5 further comprising:
    determining a resource element channel coefficient corresponding to one or more channels, wherein the quantizing is based at least in part on the resource element channel coefficient.

7. The method of claim 4, wherein the one or more coefficients comprise a reference signal received power, a reference signal received quality, a signal-to-interference ratio, a signal-to-interference and noise ratio, a tap value, an energy metric, or a combination thereof.

8. The method of claim 1 further comprising:
    determining that a signal-to-noise ratio for the channel satisfies a threshold based at least in part on performing the channel estimation; and
    encrypting the second message and one or more repeated pilot signals with the secret key based at least in part on the signal-to-noise ratio satisfying the threshold.

9. The method of claim 1 further comprising:
    determining that a signal-to-noise ratio for the channel satisfies a threshold based at least in part on performing the channel estimation; and
    performing a key refinement procedure to obtain a refined secret key based at least in part on the signal-to-noise ratio satisfying the threshold, wherein the second message is encrypted with the refined secret key.

10. The method of claim 1, wherein the first message comprises a bitmap indicating the one or more taps.

11. The method of claim 10 further comprising:
    receiving, prior to receiving the first message, a third message indicating a plurality of bitmaps comprising the bitmap, each bitmap indicating a set of taps;
    receiving, prior to receiving the first message and after receiving the third message, a fourth message indicating one or more bitmaps comprising the bitmap, wherein the first message comprises a downlink control information message, the third message comprises radio resource control signaling, and the fourth message comprises a medium access control-control element; and
    selecting the one or more taps based at least in part on receiving the first message, the third message, and the fourth message.

12. The method of claim 1, wherein receiving the first message comprises:
    receiving the one or more reference signals on one or more resources that include the first message.

13. The method of claim 12 further comprising:
    receiving a control message configuring a resource pool for sidelink communications with the second wireless device, wherein the resource pool comprises the one or more resources configured with one or more bitmaps, wherein at least one bitmap of the one or more bitmaps indicates the one or more taps.

14. The method of claim 12, wherein a resource configuration for the one or more reference signals comprises a bitmap indicating the one or more taps.

15. The method of claim 1 further comprising:
    selecting the one or more taps according to a threshold value of non-zero taps based at least in part on the first message, wherein the threshold value of non-zero taps is configured at the first wireless device.

16. The method of claim 1 further comprising:
    selecting the one or more taps according to a random tap pattern from a set of random tap patterns based at least in part on the first message; and
    transmitting an index of the random tap pattern to the second wireless device.

17. The method of claim 1 further comprising:
    encrypting one or more fields of the second message using the secret key, wherein the second message is communicated over the channel based at least in part on the encryption.

18. The method of claim 1, wherein communicating the signaling with the second wireless device comprises:
    transmitting the signaling comprising the second message to the second wireless device; or
    receiving the signaling comprising the second message from the second wireless device.

19. A method for wireless communication at a first wireless device, comprising:

transmitting, to a second wireless device, one or more reference signals over a channel between the first wireless device and the second wireless device;
performing channel estimation for the channel based at least in part on the one or more reference signals, wherein a plurality of taps associated with the channel are determined based at least in part on the channel estimation;
transmitting a first message to the second wireless device indicating one or more taps to be selected from the plurality of taps to obtain a secret key for encrypting a second message, wherein each tap of the plurality of taps corresponds to a different path between the first wireless device and the second wireless device; and
communicating signaling with the second wireless device, the signaling comprising the second message that is encrypted with the secret key.

20. The method of claim 19 further comprising:
determining a power delay profile, a channel impulse response, or both for the channel based at least in part on performing the channel estimation; and
selecting the one or more taps to indicate in the first message from the power delay profile, the channel impulse response, or a combination thereof based at least in part on the channel estimation and the transmitted first message.

21. The method of claim 20, wherein the first message indicates the one or more taps according to a power threshold corresponding to the channel being satisfied at the second wireless device.

22. The method of claim 19 further comprising:
determining one or more coefficients corresponding to a location of the one or more taps, wherein the secret key is obtained based at least in part on the one or more coefficients.

23. The method of claim 22 further comprising:
mapping one or more taps to the one or more coefficients based at least in part on a respective index of each tap of the one or more taps; and
quantizing the one or more coefficients based at least in part on applying a key derivation function to the one or more coefficients to obtain the secret key.

24. The method of claim 19 further comprising:
determining that a signal-to-noise ratio for the channel satisfies a threshold based at least in part on performing the channel estimation; and
encrypting the second message and one or more repeated pilot signals with the secret key based at least in part on the signal-to-noise ratio satisfying the threshold.

25. The method of claim 19 further comprising:
determining that a signal-to-noise ratio for the channel satisfies a threshold based at least in part on performing the channel estimation; and
performing a key refinement procedure to obtain a refined secret key based at least in part on the signal-to-noise ratio satisfying the threshold, wherein the second message is encrypted with the refined secret key.

26. The method of claim 19, wherein the first message comprises a bitmap indicating the one or more taps, the method further comprising:
transmitting, prior to transmitting the first message, a third message indicating a plurality of bitmaps comprising the bitmap, each bitmap indicating a set of taps; and
transmitting, prior to transmitting the first message and after transmitting the third message, a fourth message indicating one or more bitmaps comprising the bitmap, wherein the first message comprises a downlink control information message, the third message comprises radio resource control signaling, and the fourth message comprises a medium access control-control element, wherein indicating the one or more taps is based at least in part on transmitting the first message, the third message, and the fourth message.

27. The method of claim 19 further comprising:
determining a threshold value of non-zero taps for the second wireless device; and
selecting the one or more taps to indicate in the first message according to the threshold value of non-zero taps.

28. The method of claim 19 further comprising:
receiving, from the second wireless device, an index of a random tap pattern from a set of random tap patterns, wherein the first message comprises the set of random tap patterns.

29. An apparatus for wireless communication at a first wireless device, comprising:
a processor,
memory coupled with the processor; and
instructions stored in the memory and executable by the processor to cause the apparatus to:
receive, from a second wireless device, one or more reference signals over a channel between the first wireless device and the second wireless device;
perform channel estimation for the channel based at least in part on the one or more reference signals, wherein a plurality of taps associated with the channel are determined based at least in part on the channel estimation;
receive a first message from the second wireless device indicating one or more taps to be selected from the plurality of taps to obtain a secret key for encrypting a second message, wherein each tap of the plurality of taps corresponds to a different path between the first wireless device and the second wireless device; and
communicate signaling with the second wireless device, the signaling comprising the second message that is encrypted with the secret key.

30. An apparatus for wireless communication at a first wireless device, comprising:
a processor;
memory coupled with the processor; and
instructions stored in the memory and executable by the processor to cause the apparatus to:
transmit, to a second wireless device, one or more reference signals over a channel between the first wireless device and the second wireless device;
perform channel estimation for the channel based at least in part on the one or more reference signals, wherein a plurality of taps associated with the channel are determined based at least in part on the channel estimation;
transmit a first message to the second wireless device indicating one or more taps to be selected from the plurality of taps to obtain a secret key for encrypting a second message, wherein each tap of the plurality of taps corresponds to a different path between the first wireless device and the second wireless device; and
communicate signaling with the second wireless device, the signaling comprising the second message that is encrypted with the secret key.

* * * * *